United States Patent
Ohta et al.

(10) Patent No.: US 7,103,221 B2
(45) Date of Patent: Sep. 5, 2006

(54) IMAGE PROCESSING APPARATUS AND METHOD

(75) Inventors: Ken-ichi Ohta, Kanagawa-ken (JP); Masahiro Funada, Kanagawa-ken (JP); Yushi Matsukubo, Kanagawa-ken (JP); Junichi Yamakawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 10/291,496

(22) Filed: Nov. 12, 2002

(65) Prior Publication Data

US 2003/0067632 A1     Apr. 10, 2003

Related U.S. Application Data

(62) Division of application No. 08/627,567, filed on Apr. 4, 1996, now Pat. No. 6,549,657.

(30) Foreign Application Priority Data

| Apr. 6, 1995 | (JP) | ................................. 7-081526 |
| Jul. 13, 1995 | (JP) | ................................. 7-177715 |
| Jul. 13, 1995 | (JP) | ................................. 7-177717 |

(51) Int. Cl.
*G06K 9/34* (2006.01)
*G06K 15/00* (2006.01)
*H04N 1/40* (2006.01)

(52) U.S. Cl. ...................... 382/173; 382/176; 358/448; 358/3.03; 358/3.21

(58) Field of Classification Search ............... 382/173, 382/175, 186, 184, 176, 205, 270, 274; 358/455, 358/456, 466, 459, 458, 465, 448, 296, 518, 358/447, 445, 464, 3.21, 3.03
See application file for complete search history.

(56) References Cited

U.S. PATENT DOCUMENTS

| 4,739,397 | A | 4/1988 | Hayashi ........................ 358/80 |
| 4,819,063 | A | 4/1989 | Sugiura et al. ............... 358/75 |
| 4,958,219 | A | 9/1990 | Kadowaki ..................... 358/75 |
| 5,073,953 | A | 12/1991 | Westdijk ...................... 382/176 |
| 5,109,274 | A | 4/1992 | Washio et al. ............... 358/518 |
| 5,113,252 | A | 5/1992 | Horie et al. ................... 358/77 |
| 5,119,185 | A | 6/1992 | Ikeda et al. ................... 358/75 |

(Continued)

FOREIGN PATENT DOCUMENTS

JP          55-091057          7/1980

(Continued)

*Primary Examiner*—Wenpeng Chen

(74) *Attorney, Agent, or Firm*—Fitzpatrick, Cella, Harper & Scinto

(57) ABSTRACT

In order to produce a high-quality output of an image which is a mixture of images having different characteristics, there is provided an image processing apparatus having an image memory storing an entered color image and a feature detector, arranged for detecting a feature signal from the entered color image and storing the feature signal in the image memory. The feature signal represents a feature of the entered color image. An outputter is arranged for reading an image signal of the entered color image and the feature signal thereof out of the image memory, and outputting the image and feature signals as a recording signal. Processors are arranged for respectively processing one of a number of color components, which represent color image information, in accordance with the recording signal. The detection and storage in the image memory of feature signals and the readout of the image signal and associated feature signal from the image memory are performed in parallel.

2 Claims, 25 Drawing Sheets

U.S. PATENT DOCUMENTS

| | | | | |
|---|---|---|---|---|
| 5,165,072 | A | 11/1992 | Kurita et al. | 358/448 |
| 5,189,523 | A | 2/1993 | Sugiura et al. | 358/300 |
| 5,208,663 | A * | 5/1993 | Hiratsuka et al. | 358/500 |
| 5,239,383 | A | 8/1993 | Ikeda et al. | 358/300 |
| 5,249,061 | A | 9/1993 | Nagashima et al. | 358/296 |
| 5,265,196 | A | 11/1993 | Haneda | 358/1.9 |
| 5,315,382 | A | 5/1994 | Tanioka | 358/523 |
| 5,355,232 | A | 10/1994 | Kataoka | 358/451 |
| 5,379,130 | A | 1/1995 | Wang et al. | 358/462 |
| 5,404,156 | A | 4/1995 | Yamada et al. | 347/115 |
| 5,420,938 | A | 5/1995 | Funada et al. | 382/173 |
| 5,428,464 | A | 6/1995 | Silverbrook | 358/501 |
| 5,541,740 | A * | 7/1996 | Mori | 358/447 |
| 5,638,183 | A | 6/1997 | Hayashi et al. | 358/448 |
| 5,642,208 | A | 6/1997 | Takahashi et al. | 358/501 |
| 5,729,624 | A | 3/1998 | Tanioka et al. | 382/162 |
| 5,878,161 | A | 3/1999 | Ishida et al. | 382/198 |
| 6,088,130 | A | 7/2000 | Matsukubo | 358/447 |
| 6,192,152 | B1 | 2/2001 | Funada et al. | 382/199 |
| 6,473,204 | B1 | 10/2002 | Suzuki et al. | 358/448 |

FOREIGN PATENT DOCUMENTS

| | | | |
|---|---|---|---|
| JP | 55091057 | * | 7/1980 |
| JP | 03-112264 | | 5/1991 |
| JP | A4-132462 | | 6/1992 |
| JP | 04-281671 A | | 10/1992 |
| JP | 05-038846 A | | 2/1993 |
| JP | A5-030347 | | 2/1993 |
| JP | 5-083540 A | | 4/1993 |
| JP | 5-108809 A | | 4/1993 |
| JP | 05-284356 A | | 10/1993 |
| JP | A5-344328 | | 12/1993 |
| JP | 06-139032 A | | 5/1994 |
| JP | 06-139343 A | | 5/1994 |
| JP | 06-195511 A | | 7/1994 |
| JP | 06-290267 A | | 10/1994 |
| JP | 07-029021 A | | 1/1995 |
| JP | A7-058967 | | 3/1995 |
| JP | A7-099588 | | 4/1995 |

* cited by examiner

| a1 | a2 | a3 |
| --- | --- | --- |
| a4 | a5 | a6 |
| a7 | a8 | a9 |

FIG. 5A  301

| 100 | 110 | 112 |
|-----|-----|-----|
| 105 | 108 | 114 |
| 110 | 112 | 116 | icnt  = 7
iemax = 8
↓
icode = 0

FIG. 5B  302

| 0 | 255 | 0 |
|---|-----|---|
| 0 | 255 | 0 |
| 0 | 255 | 0 | icnt  = 2
iemax = 255
↓
icode = 1

FIG. 5C  303

| 128 | 255 | 0 |
|-----|-----|---|
| 128 | 255 | 0 |
| 128 | 255 | 0 | icnt  = 3
iemax = 255
↓
icode = 1

FIG. 5D  304

| 80 | 80 | 80 |
|----|----|----|
| 80 | 80 | 80 |
| 80 | 80 | 80 | icnt  = 1
iemax = 0
↓
icode = 0

FIG. 5E  305

| 0   | 0   | 255 |
|-----|-----|-----|
| 255 | 255 | 0   |
| 0   | 0   | 0   | icnt  = 2
iemax = 255
↓
icode = 1

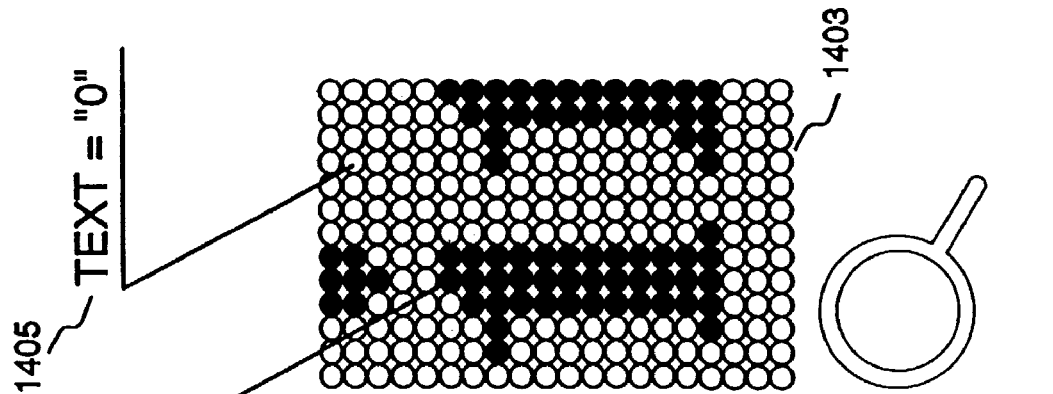
FIG. 19C  TEXT = "0"
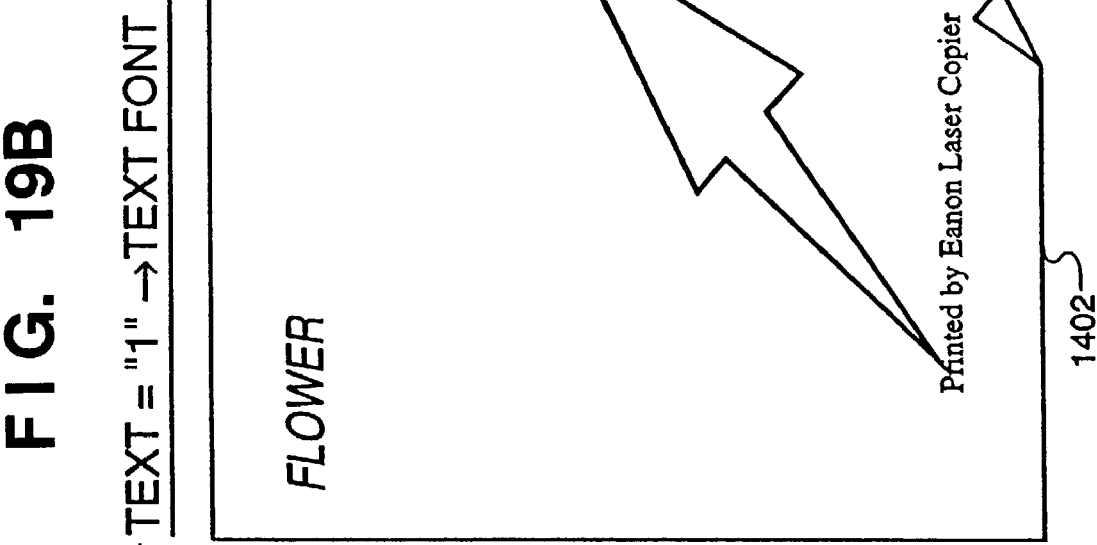
FIG. 19B  TEXT = "1" → TEXT FONT
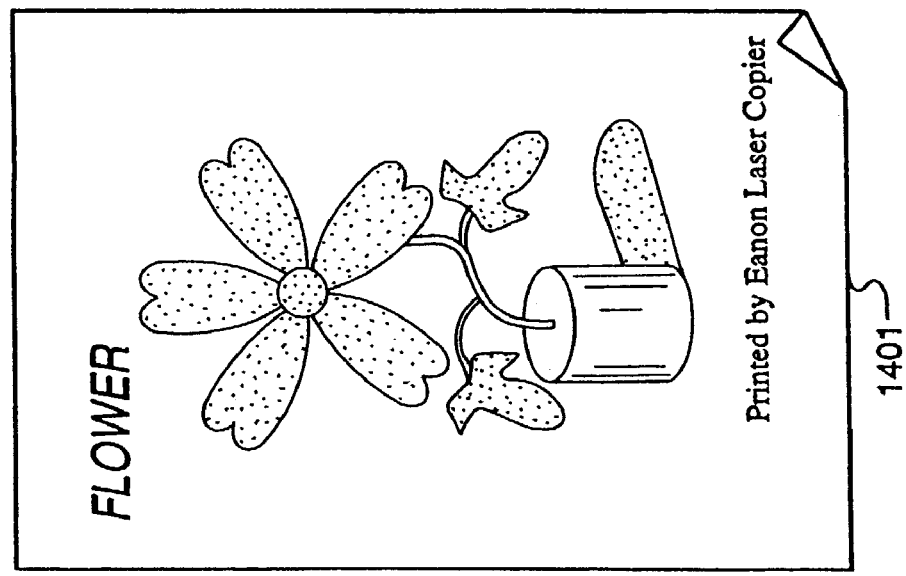
FIG. 19A

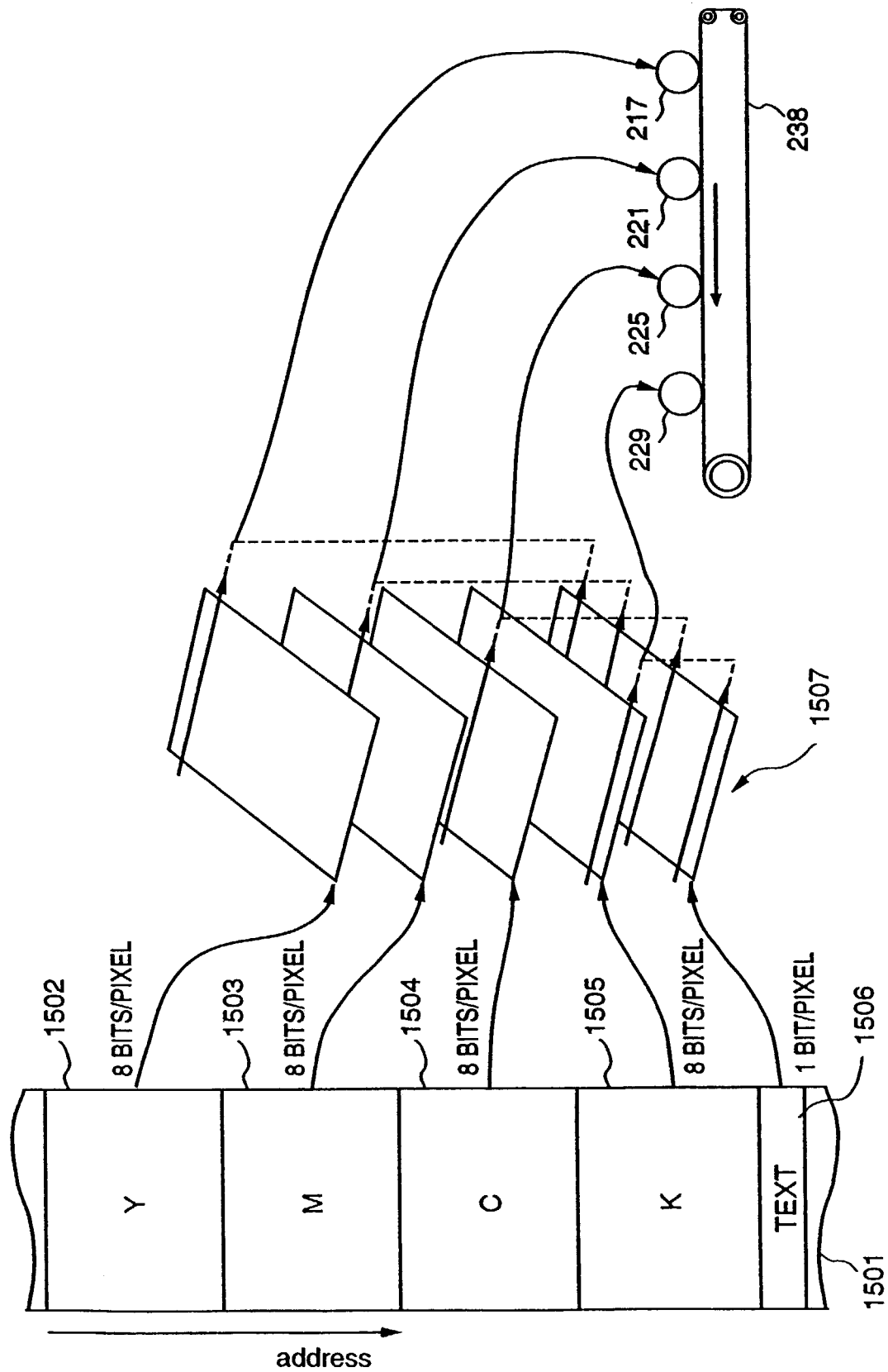

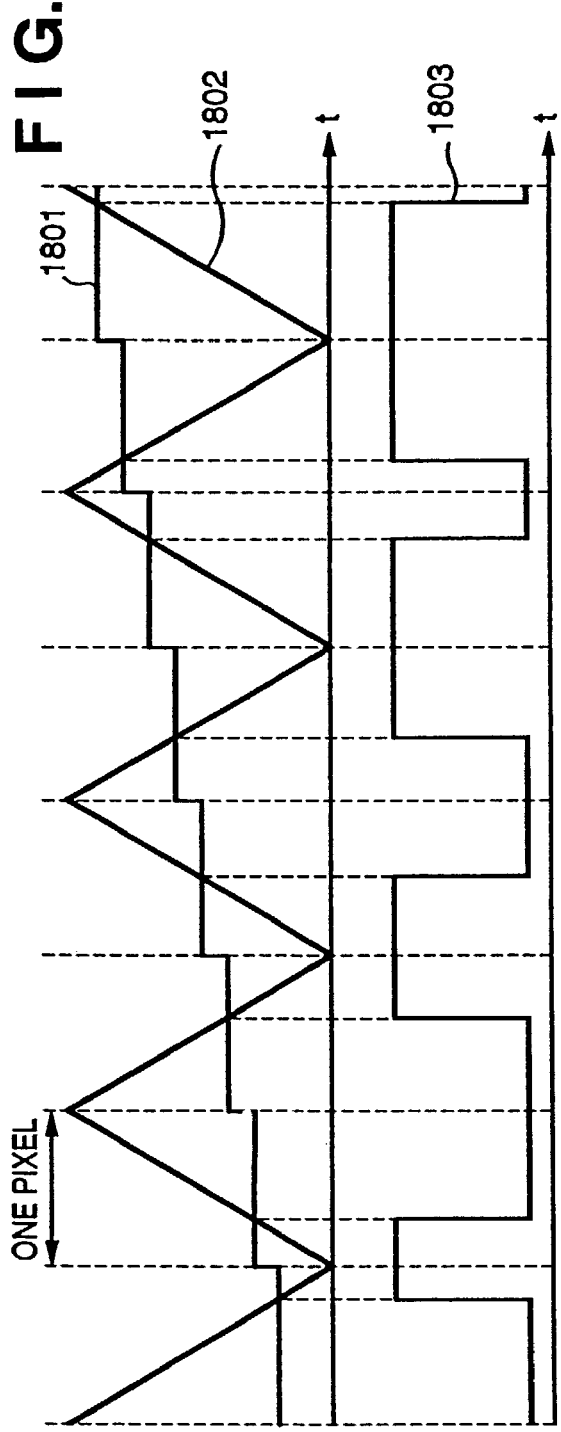
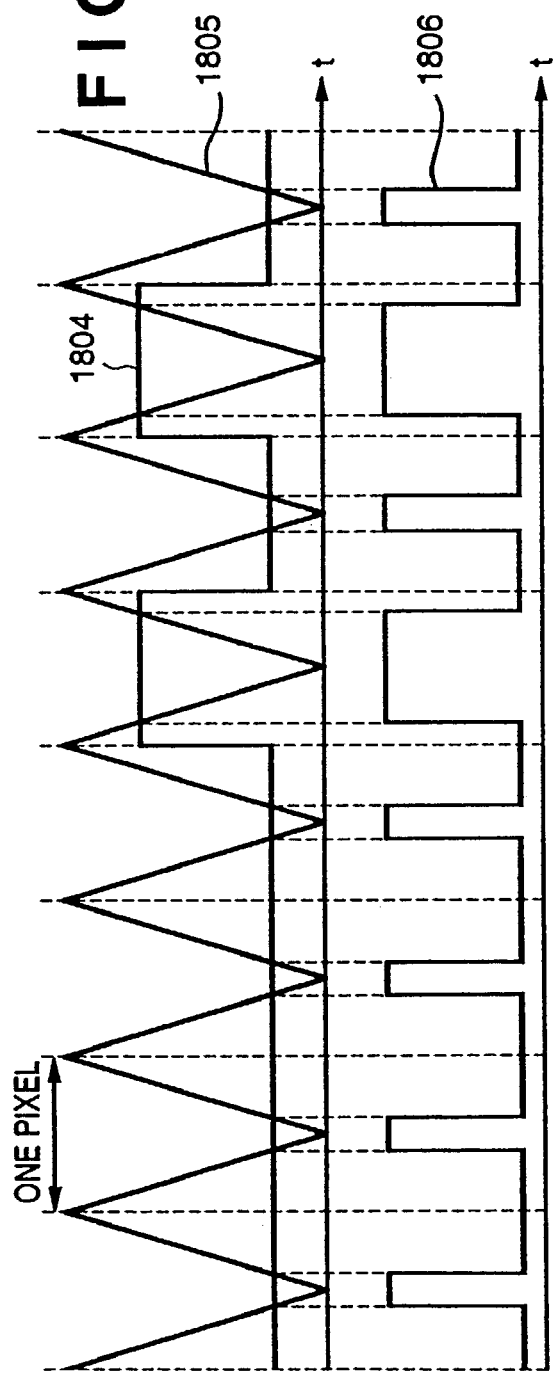

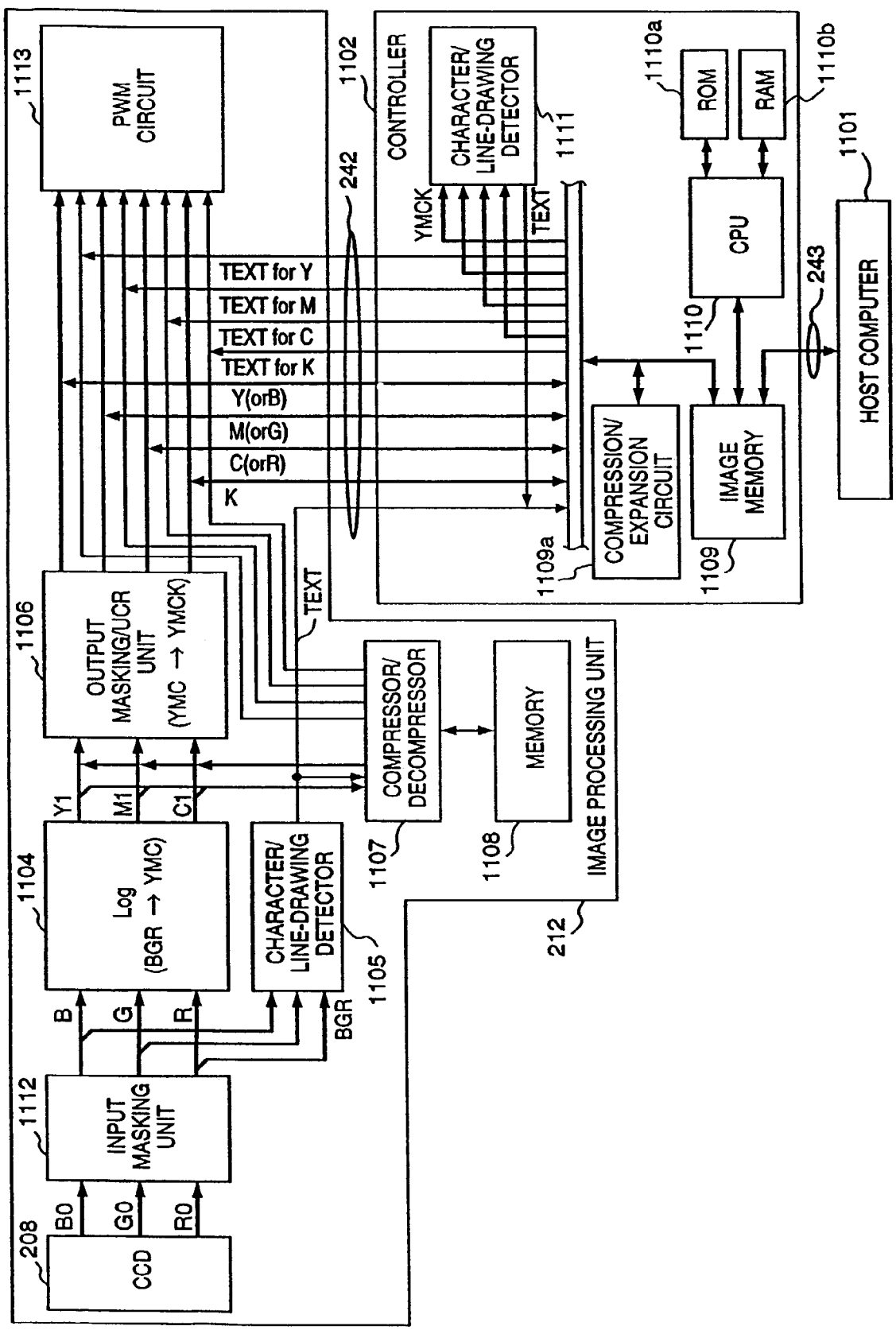

IMAGE PROCESSING APPARATUS AND METHOD

This application is a division of application Ser. No. 08/627,567, which was filed on Apr. 4, 1996, now U.S. Pat. No. 6,549,657.

BACKGROUND OF THE INVENTION

1. Field of the Invention

This invention relates an image processing apparatus and method, particularly an image processing apparatus and method for producing a high-quality output of an image.

2. Description of the Related Art

When a document created and edited by a computer is outputted as a hard copy, generally this is implemented by the following procedure: A printer driver or the like operated by the computer replaces the document information by a group of commands describing image information, and the group of commands is transferred to a command interpreter in an image-output unit. The command interpreter creates a raster image in conformity with the group of commands received and sends the raster image to an image output section.

This command system for describing image information is referred to as page description language (PDL), typical examples of which are PostScript (registered trademark) and Capsl (registered trademark).

The construction of a system which uses PDL is illustrated in FIG. 9. The system includes a host computer 801 which designates a hard-copy output, a PDL interpreter 802, an image memory 803, a binarizing circuit 804, a printer 805 and a controller 806 for controlling the PDL interpreter 802, image memory 803, binarizing circuit 804 and printer 805.

The host computer 801 transfers data, such as a document to be outputted as a hard copy, to the PDL interpreter 802 as PDL data. The PDL interpreter 802 converts the PDL data, which have been accepted from the host computer 801, to raster image data and writes the raster image data in an image memory 803.

When the interpreter 802 converts all of the PDL data sent from the host computer 801 to raster image data, the interpreter notifies the controller 806 of the end of processing. Upon being notified of the end of processing by the PDL interpreter 802, the controller 806 transfers the raster image data, which have been stored in the image memory 803, to the printer 805 and causes the printer 805 to output a hard-copy image.

The data that have been stored in the image memory 803 generally possess information on the order of eight bits (256 grays) per pixel. This means that if the printer 805 is of the ink-jet type in which one pixel can only be expressed by a binary value indicative of black or white, the data that have been stored in the image memory 803 cannot be transferred to the printer 805 as is. In such case the controller 806 operates in such a manner that the data stored in the image memory 803 are transferred to the printer 805 after they are converted to binary information by the binarizing circuit 804.

A case in which an image of the kind shown in FIG. 10 is outputted as a hard copy by the system of FIG. 9 will be considered.

As shown in FIG. 10, numeral 901 denotes a continuous grayscale image obtained by reading a silver chloride photograph using a scanner, 902 character information created by a word processor, and 903, 904 a pie graph and a line graph, respectively, created using the graphing function of tabulation software.

In such a case where a plurality of images having different characteristics are contained in a single overall image, the following difficulties arise when eight-bit date are converted to one-bit data by the binarizing circuit 804:

(1) When simple binarization is performed as by adopting "1" as the value for values of 128 (which is the intermediate value of the 256 gray levels) or greater and "0" as the value for values of 127 or less, the tonality or shading of the continuous grayscale image portion is lost. Further, it becomes difficult to distinguish among the pie segments of the pie graph, which expresses the segments by shading the segments using different levels in the 256 gray levels. The result is loss of information.

(2) When pseudo-halftone binarization such as the error-diffusion method is used, the drawbacks mentioned in (1) above are eliminated. However, black dots are produced in the vicinity of the characters or of the lines of the line graph. This leads to an unattractive appearance and to the blurring of lines.

These shortcomings are encountered not only in ink-jet printers which form binary images but also, though to a somewhat different extent, in printers which form binary images by a different printing method and in printers having an expression capability better than that of binary.

The following methods of solving these problems are available:

(A) Two bitmap memories, one for a binary image and one for a continuous grayscale image, are provided, data representing a character or line drawing suited to simple binarization are written in the bitmap memory for the binary image, and data representing the continuous grayscale image suited to pseudo-halftone binarization are written in the bitmap memory for the continuous grayscale image. At the time of output, the data stored in the respective memories are binarized by the methods suited thereto and the binarized data are then transferred to the printer.

(B) An image-area discriminating circuit is provided on the input side of a binarizing circuit and is used to determine, pixel by pixel, whether data which enter the binarizing circuit represent a continuous grayscale image or a character or line drawing. The binarizing method performed by the binarizing circuit is switched, on a per-pixel basis, in accordance with the determination made.

However, the following problems still remain even if these methods are employed:

According to method (A), the type of image data (character/line drawing or continuous grayscale image, etc.) can be ascertained by referring to the PDL data, and it is possible to change over the storage location of the raster-image data accordingly However, since it is necessary to provide the PDL interpreter with this function, the PDL interpreter must be modified.

According to method (B), the raster-image data converted from the PDL data are subjected to well-known image-area discrimination processing in which reference is made to a density histogram or a density gradient of density between neighboring pixels. As a result, discrimination errors tend to occur. For example, if a continuous grayscale image portion is mistakenly discriminated as a character portion, only this erroneously discriminated grayscale image portion will be simply binarized. The result will be output of an unnatural image.

SUMMARY OF THE INVENTION

Accordingly, an object of the present invention is to provide an image processing apparatus and method whereby it is possible to produce a high-quality output of an image which is a mixture of images having different characteristics, such as characters, line drawings and continuous grayscale images.

According to the present invention, the foregoing object is attained by providing an image processing apparatus comprising developing means for developing entered image information described in a page description language and storing developed image data for each pixel in first storage means; a discriminating means for discriminating a characteristic of an image, pixel by pixel, by referring to the image data that have been stored in said first storage means, and storing a discrimination code representing a result of discrimination in second storage means, wherein said discriminating means performs discrimination processing by referring to image data of an area comprising the pixel of interest and a plurality of pixels surrounding said pixel of interest, and said processing is based upon items of image data having different values present in said area and a maximum value of differences between said pixel of interest and said pixels surrounding said pixel of interest; a readout means for reading the image data stored in said first storage means and reading the discrimination code, which corresponds to the image data pixel by pixel, out of said second storage means; and a converting means for converting the image data, which have been read out of said first storage means by said readout means, to a pulse-width modulated signal having a period according to the discrimination code read out of said second storage means by said readout means; and a method therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A through 5E are diagrams showing specific examples of discriminating the image area depicted in FIG. 4;

FIGS. 19A through 19C are diagrams for describing a discrimination signal TEXT;

FIG. 20 is a diagram for describing the structure and method of reading data held in an image memory shown in FIG. 14;

FIGS. 23A and 23B are timing charts illustrating the operation of the PWM circuit.

FIG. 27 is a block diagram illustrating the construction of a modification of the fourth embodiment.

DESCRIPTION OF THE PREFERRED EMBODIMENTS

Embodiments according to the present invention will now be described in detail with reference to the drawings.

First Embodiment

[Construction]

Figure 1:
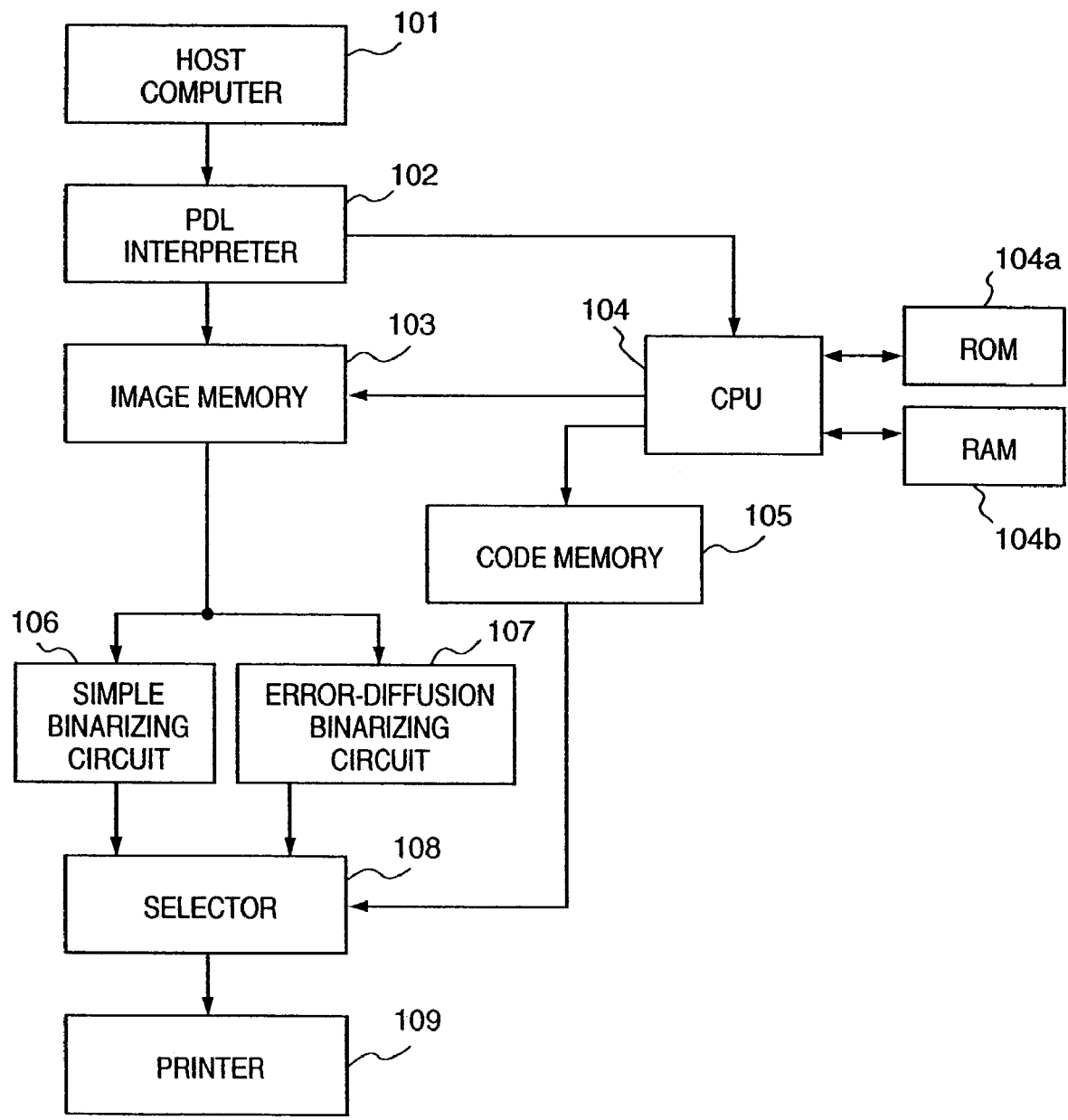
FIG. 1 is a block diagram showing the construction of an image processing system according to an embodiment of the present invention.

FIG. 1 is a block diagram showing the construction of an image processing system according to a first embodiment of the present invention.

As shown in FIG. 1, a host computer 101 generates PDL data (command) which forms an output image, and a PDL interpreter 102 interprets and develops the PDL data, which has been sent from the host computer 101, to raster-image data for each pixel. The raster-image data are stored in an image memory 103. When processing executed by the PDL interpreter 102 ends, a CPU 104 refers to the data stored in the image memory 103, discriminates, on a per-pixel basis, whether a pixel of interest is that of a character/line-drawing portion or continuous grayscale image portion and writes code information, which is indicative of the result of discrimination, in a code memory 105 on a per-pixel basis.

An image processing program and a control program executed by the CPU 104, as well as various data, are stored in a ROM 104a in advance. A RAM 104b is utilized as the working memory of the CPU 104.

Binarizing circuits 106, 107, which receive the raster-image data stored in the image memory 103, binarize the image data so that a hard copy may be produced by a printer 109. The binarizing circuit 106 is a simple binarizing circuit for performing simple binarization based upon a predetermined threshold value, and the binarizing circuit 107 is a well-known error-diffusion binarizing circuit for binarizing continuous grayscale image data by application of pseudo-halftone processing.

A selector 108 selects the output of either the binarizing circuit 106 or 107 and delivers the output to the printer 109. The selection is carried out on a per-pixel basis using the code information that has been stored in the code memory 105.

The printer 109 is an ink-jet printer or the like for forming a binary image. Further, the destination of the output of image data processed by the image processing system of this embodiment is not limited to a printer. For example, the data may be delivered to a monitor of a ferroelectric liquid-crystal display or the like.

[Operation]

Figure 2:
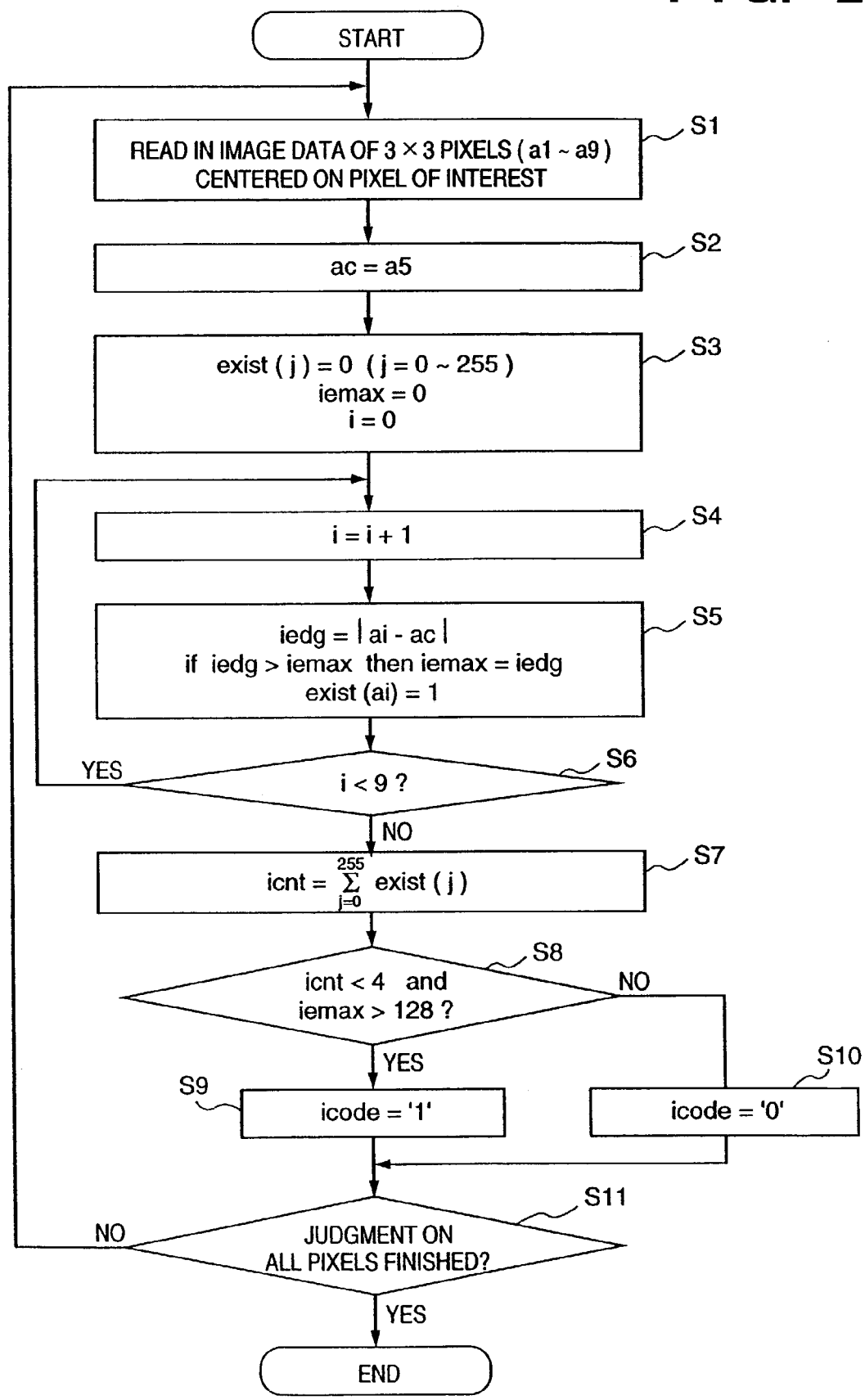
FIG. 2 is a flowchart showing processing for discriminating the type of an image.

The operation of this embodiment constructed as set forth above will now be described with reference to the flowchart of FIG. 2. The processing illustrated in FIG. 2 is executed by the CPU 104. Further, in this embodiment, it is assumed that the data that have been written in the image memory 103 are represented by eight bits (0~255) per pixel.

Figures 3, 4:
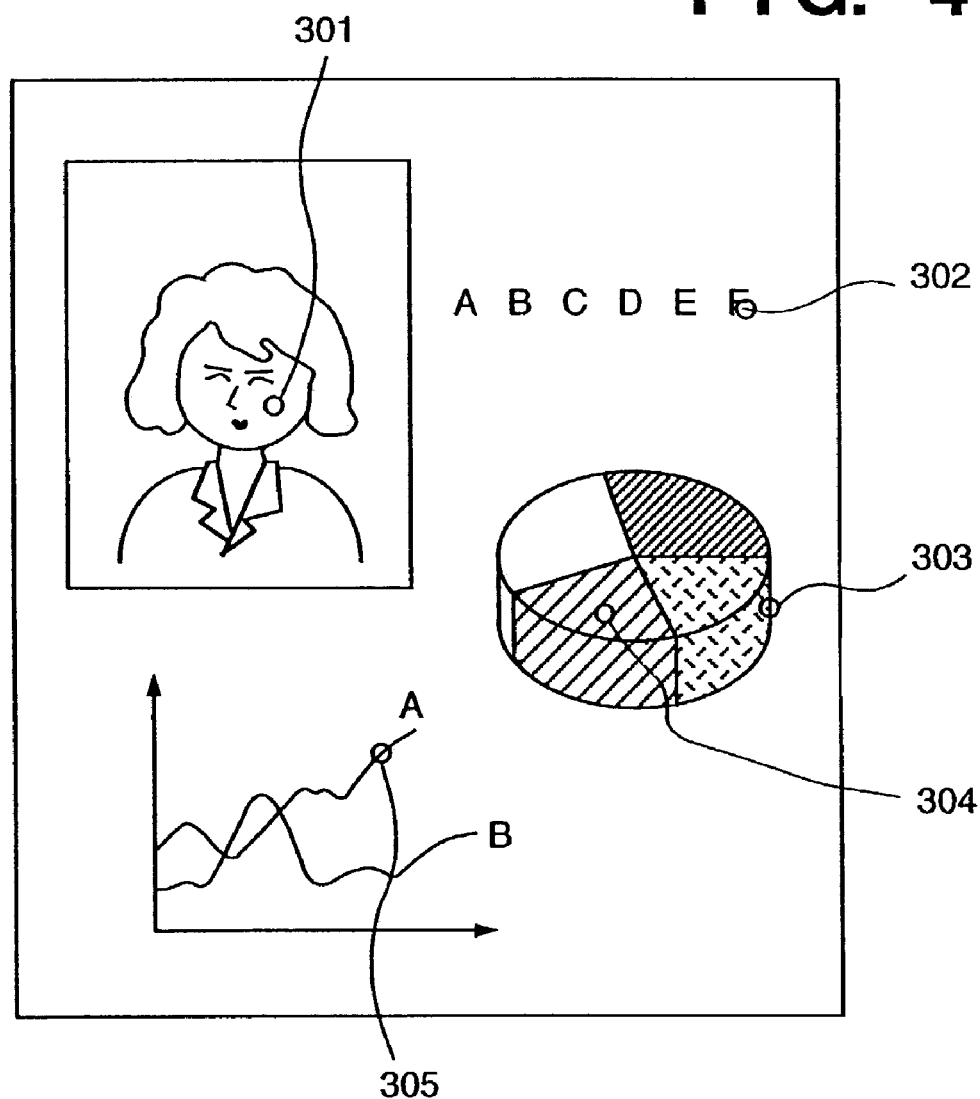
FIG. 3 is a diagram showing 3'3 pixel areas used in discriminating the type of an image.
FIG. 4 is a diagram for describing discrimination of the type of image.

First, at step S1, the CPU 104 goes to the image memory 103 to read out image data of 3'3 pixels a1~a9 centered on a pixel of interest a5 shown in FIG. 3. The CPU 104 substitutes the image data of the pixel of interest 15 into a variable ac at step S2.

Next, the CPU 104 initializes working variables at step S3. More specifically, an array variable exist(j) (j=0~255) for counting the number of data of different levels contained in the 3'3 pixels is cleared to zero, a variable iemax for obtaining the maximum value of amount of change iedg in the data representing the 3'3 pixel areas is cleared to zero, and a loop variable i is initialized to 1.

Next, at step S4, the CPU 104 increments the loop variable i. This is followed by step S5, at which the CPU 104 calculates |ai-ac|, substitutes the result into the variable iedg and, if iedg>iemax holds, substitutes iedg into iemax and substitutes 1 into exist(ai). The processing of steps S4 and S5 is repeated with regard to i=1~9 by the decision processing of step S6. The foregoing processing provides the maximum value of absolute values of the differences between items of the image data of the 3'3 pixels a1~a9, which are centered on the pixel of interest a5, and the pixel a5.

The CPU 104 finds the sum total icnt of exist(j) at step S7. Here icnt represents the number of different data which appear in the 3'3 pixel areas.

This is followed by step S8, at which the CPU 4 judges whether the pixel of interest is in a character/line-drawing area or in a continuous grayscale image area. If the condition of Equation (1) below holds, the CPU 104 judges that the pixel of interest a5 is in a character/line-drawing area, advances the program to step S9, generates "1" as a decision code icode and then advances the program to step S11.

$$\text{icnt}<4 \text{ and iemax}>128 \tag{1}$$

If Equation (1) does not hold, on the other hand, the CPU 104 judges that the pixel of interest a5 is in a continuous grayscale image area, advances the program to step S10, generates "0" as the decision code icode and then advances the program to step S11. It should be noted that the icode is written in the code memory 105 at a location corresponding to the pixel a5.

Next, at step S11, the CPU 104 determines whether the above-mentioned judgment has been made with regard to all pixels. If all pixels have not yet been judged, then the program returns to step S1 and the next pixel is subjected to processing. In a case where all pixels of the raster-image data stored in the image memory 103 have undergone discrimination, the CPU 104 will have written the judgment codes corresponding to the respective pixels in the code memory 105. The CPU 104 then terminates processing.

By executing the foregoing processing, both code information (the judgment code icode) and the raster-image data are compiled. The CPU 104 reads the raster-image data out of the image memory 103 pixel by pixel and sends the icode, which has been stored in the code memory 105, to the selector 108, thereby selecting either the simple binarizing circuit 106 or error-diffusion binarizing circuit 107 and causing the selected binarizing circuit to perform binarization conforming to the type of image data.

More specifically, the data that have been stored in the image memory 103 are read out successively starting from the beginning thereof and the data are binarized by the binarizing circuits 106 and 107 in parallel. At the same time, icode that has been stored in the code memory 105 is read out and entered into the selector 108 as a select signal. In a case where icode is "1", the output of the simple binarizing circuit 106 is selected and sent to the printer 109. If icode is "0", the output of the error-diffusion binarizing circuit 107 is selected and sent to the printer 109.

Thus, a high-quality hard-copy output conforming to the characteristics of various images mixed in an overall image is obtained from the printer 109.

[Details of Discrimination Processing]

FIG. 4 is a diagram for describing an example of an image in which images having various characteristics are mixed.

FIGS. 5A through 5E are diagrams showing the manner in which each area of FIG. 4 is discriminated. These diagrams illustrate the values of the image data of the 3'3 pixel areas indicated by 301~305 in FIG. 4, as well as the results of judging these values.

With regard to an image area 301 in the continuous grayscale image portion, as shown in FIG. 5A, the probability that different data will appear among the 3'3 pixels is high (icnt=7) and the difference between the data of the pixel of interest and of the neighboring pixels is small (iemax=8). Consequently, Equation (1) does not apply and the image area 301 is judged to be a continuous grayscale image area.

On the other hand, with regard to the areas of the characters and line drawings, namely the image areas 302, 303 and 305, as shown in FIGS. 5B, 5C and 5E, respectively, the probability that different data will appear is low and the difference between the data of the pixel of interest and of the neighboring pixels is very large. Consequently, Equation (1) applies and these image areas are judged to be character areas or line-drawing areas.

In a case where 80 is the only data that appears, icnt is small but the difference between the data of the pixel of interest and of the neighboring pixels is small, as in the case of the image area 304 in FIG. 5D, the area is judged to be a continuous grayscale image area and pseudo-halftone binarization is executed.

Thus, in accordance with the first embodiment as described above, the arrangement is such that when an image which is a mixture of images having various characteristics is outputted in the form of a hard copy by a binary printer, the images are separated into their types in precise fashion and each image is subjected to image processing that conforms to the type of the image. This makes it possible to obtain a high-quality hard-copy image.

It is described above that an image is discriminated and broken down into two types of image areas, namely the area of a character or line drawing and the area of a continuous grayscale image. However, it is possible to separate an image into a number of image types and subject each image to processing suited to the image type.

Though the foregoing is described with regard to an example in which the discrimination of image type is implemented by software, it is also permissible to use hardware to implement similar functions.

Modification of First Embodiment

Figure 24:
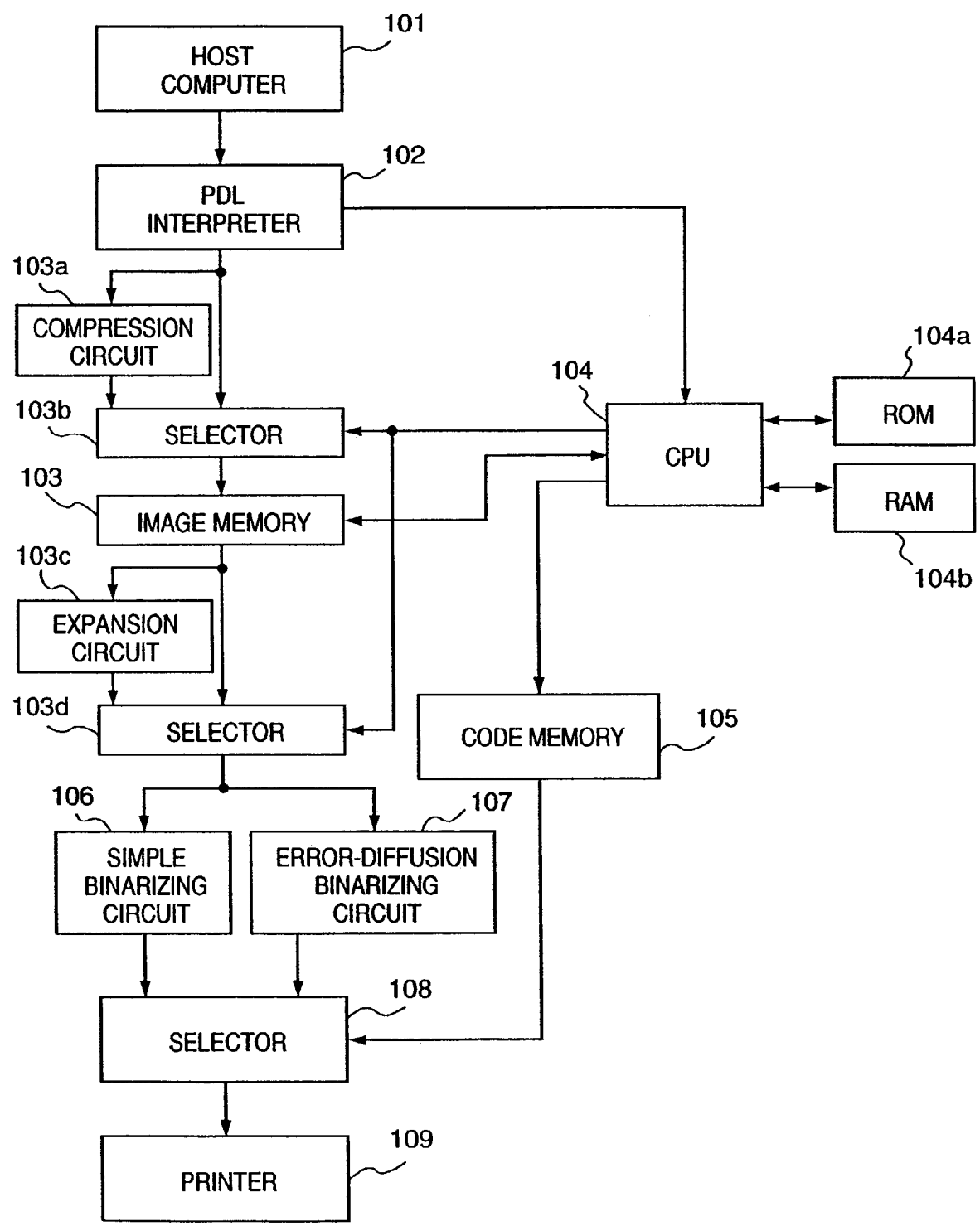
FIG. 24 is a block diagram illustrating the construction of a modification of the first embodiment.

FIG. 24 is a block diagram showing a modification of the first embodiment. In FIG. 24, components having similar functions to those in FIG. 1 have the same reference numerals.

In FIG. 24, reference numeral 103a denotes a compression circuit; 103b, a selector; 103c, an expansion circuit; and 103d, a selector. This embodiment has "compression mode" and "non-compression mode" as operation modes. These two modes are changed by switching control signals of the selectors 103b and 103d by the CPU 104.

That is, in the compression mode, the raster image data converted by the PDL interpreter 102 is compressed by the compression circuit 103a, and written into the image memory 103 and held in the image memory 103. On the other hand, in the non-compression mode, the raster image data is not compressed, then it is written into the image memory 103, and held in the image memory 103.

The CPU 104 refers to the image information stored in the image memory 103, as image data for each pixel, and determines whether or not a pixel of interest is included in a character/line-drawing portion or in a continuous grayscale image portion, by the pixel. The CPU 104 writes code information (icode) as the determination result into the code memory 105. Note that in the non-compression mode, the CPU 104 reads the image data out of the image memory 103 and uses the read data for the above determination without expanding the data, on the other hand, in the compression mode, the CPU 104 performs the above determination after expanding the image data read out of the image memory 103 by the expansion circuit 103c.

Upon image formation in the compression mode, the compressed data read out of the image memory 103 is expanded by the expansion circuit 103c, then transferred to the binarizing circuit 106. On the other hand, upon image formation in the non-compression mode, the image data read out of the image memory 103 is not expanded before it is transferred to the binarizing circuits 106 and 107.

Note that a compression/expansion algorithm used by the compression circuit 103b and the expansion circuit 103c is arbitrary selected and not limited to a specific one. For example, block coding using an orthogonal transfer coding method based on, e.g., so-called JPEG (Joint Photographic Experts Group) standards or a DPCM (Differential Pulse Code Modulation) coding using a difference value of each pixel can be employed. In this embodiment, the compression/expansion of image data is performed by a hardware, however, it may be performed by a software.

According to the embodiment, the image memory can be efficiently used by providing the compression mode and the non-compression mode and arbitrarily select one of these mode. For example, if the above compression is an irreversible (lossy) compression method, the amount of information is controlled in the compression mode, and degradation of reproduced images can be prevented in the non-compression mode.

Second Embodiment

Figure 6:
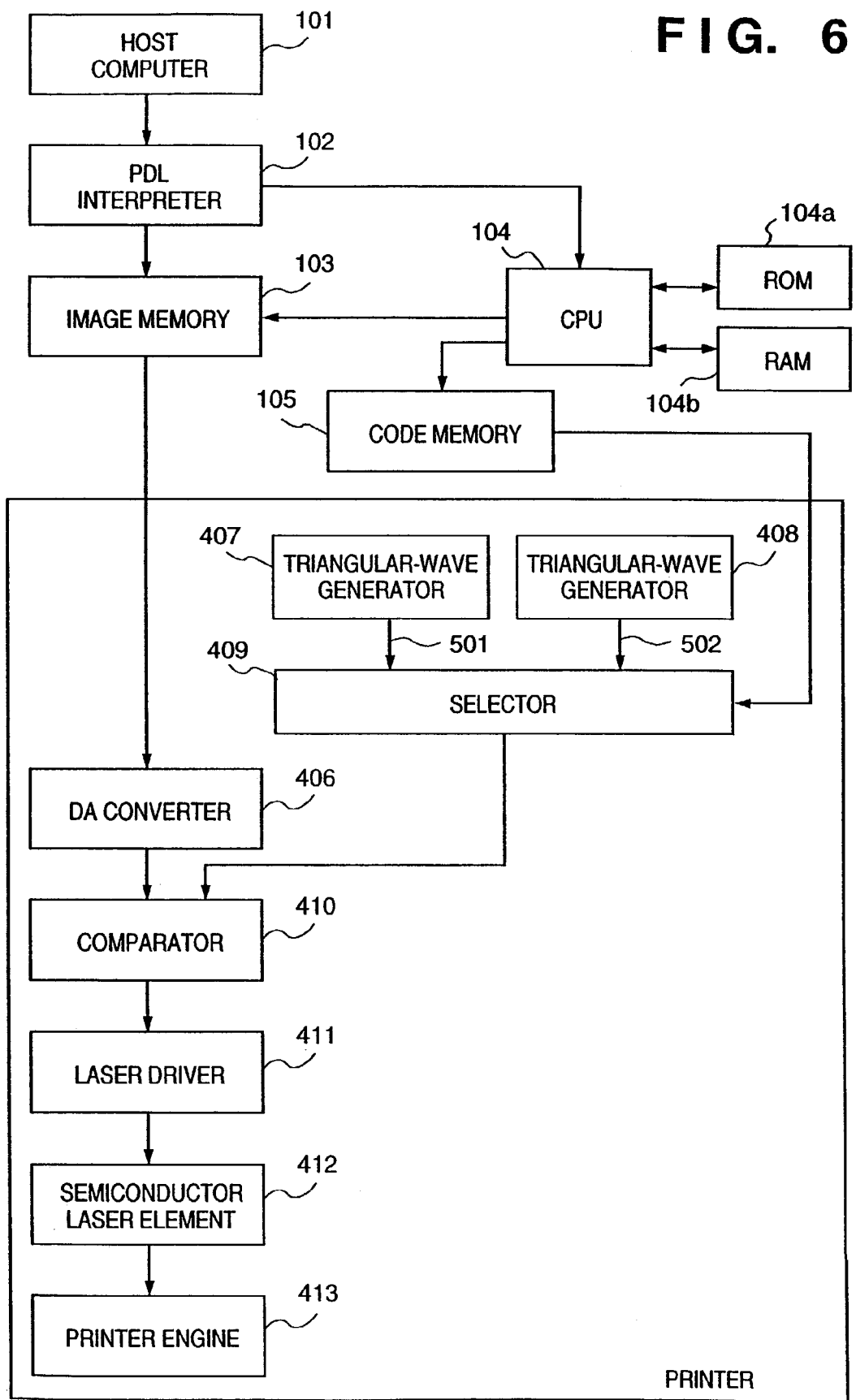
FIG. 6 is a block diagram showing the construction of an image processing system according to a second embodiment of the present invention.

FIG. 6 is a block diagram showing the construction of an image processing system according to a second embodiment of the present invention.

According to the second embodiment, the printer 109 is a laser-beam printer of the type in which a laser beam modulated by image data is made to scan by a polygon mirror rotating at high speed, thereby forming an electrostatic latent image on a photosensitive drum, and the latent image is developed by toner to form a multi-valued grayscale image. It should be noted that elements similar to those of the first embodiment are designated by like reference characters and need not be described again.

As in the first embodiment, the CPU 104 writes the code information icode, which corresponds to the raster image that has been stored in the image memory 103, in the code memory 105. The CPU 104 subsequently reads the image data out of the image memory 103 in successive fashion, reads the icode out of the code memory 105 and sends the data and icode to the printer 109. The icode entered into the printer 109 is applied to a selector 409 as a select signal, and the image data entered into the printer 109 are converted to a corresponding analog signal by a DA converter 406.

Figure 7B:
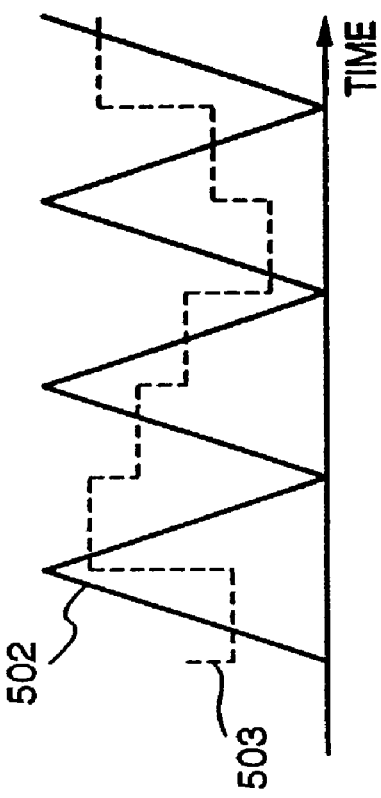
FIGS. 7A through 7D are diagrams for describing a triangular wave generated by a triangular-wave generator according to the second embodiment.
Figure 7D:
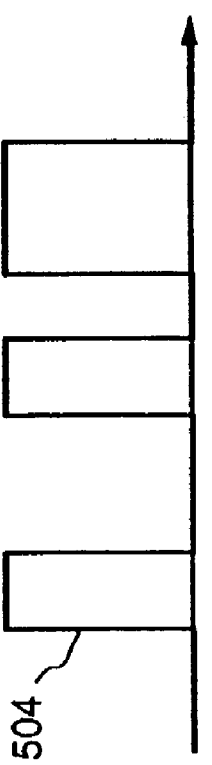
Figure 7A:
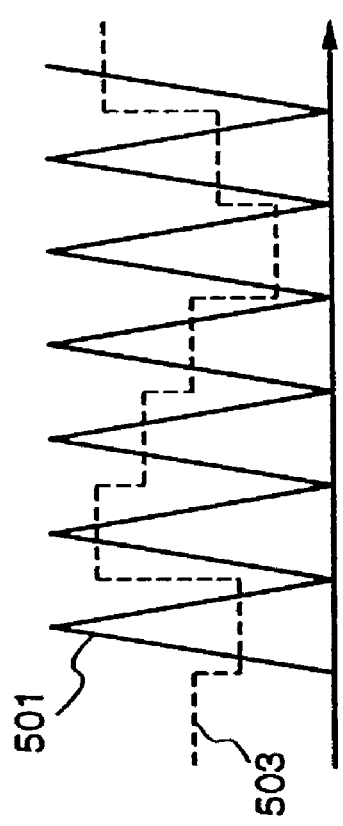

Meanwhile, two triangular-wave generators 407 and 408 respectively generate triangular waves 501 and 502 of different periods, as shown in FIGS. 7A and 7B. In accordance with icode applied thereto, the selector 409 selects either rectangular wave 501 or 502. The selector 409 selects triangular wave 501, which has the shorter period, if icode is "1" (indicative of a character area or line-drawing area), and selects triangular wave 502, which has the longer period, if icode is "0" (indicative of a continuous grayscale image area).

Figure 7C:
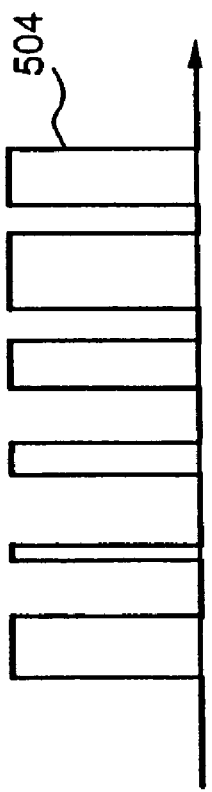

The triangular wave selected by the selector 409 enters one input terminal of a comparator 410 and is compared, pixel by pixel, with the analog image signal (503 in FIGS. 7A and 7B) converted by the DA converter 406 and applied to the other input terminal of the comparator 410. As a result, a pulse-width modulated signal (504 in FIGS. 7C and 7D) decided by the level of the image signal and the period of the triangular wave is obtained. The pulse-width modulated signal enters a laser driver 411, thereby modulating the light-emission time of a semiconductor laser element 412. The modulated laser light outputted by the semiconductor laser element 412 irradiates a photosensitive drum (not shown) in a printer engine 413, thereby forming an electrostatic latent image. An image is outputted through a well-known electrophotographic process.

In accordance with the second embodiment as described above, the laser light-emission pulse width of the semiconductor laser element is controlled using the short-period triangular wave in case of a character/line-drawing area and using the long-period triangular wave in case of a continuous grayscale image area. As a result, the shorter the pulse-width period of the laser light, the higher the resolution of the output image but the lower the reproducibility of tones. Conversely, the longer the pulse-width period of the laser light, the lower the resolution of the output image but the higher the reproducibility of tones. In a case where this characteristic is utilized in a multivalued printer to output a hard-copy image which is a mixture of images having different characteristics, a hard-copy image having excellent quality can be obtained.

Modification of Second Embodiment

Figure 25:
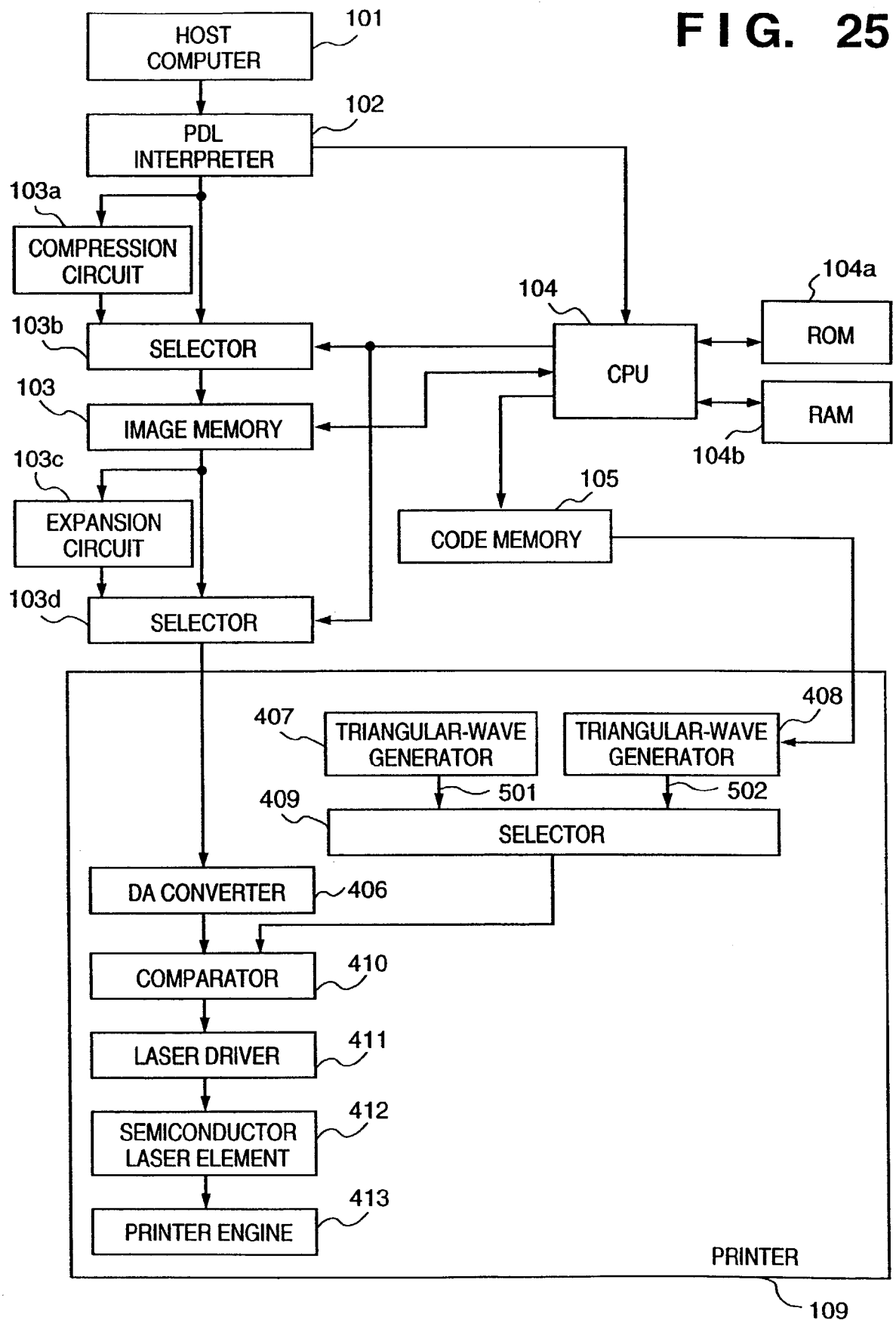
FIG. 25 is a block diagram illustrating the construction of a modification of the second embodiment.

FIG. 25 is a block diagram showing a modification of the second embodiment. This modification has the same construction shown in FIG. 6, and provides a function of selecting a compression mode or a non-compression mode, similar to the modification of the first embodiment. Accordingly, the difference from FIG. 6 is the same as that in the modification of the first embodiment described using FIG. 24, therefore, the explanation of this modification will be omitted.

Third Embodiment

Figure 8:
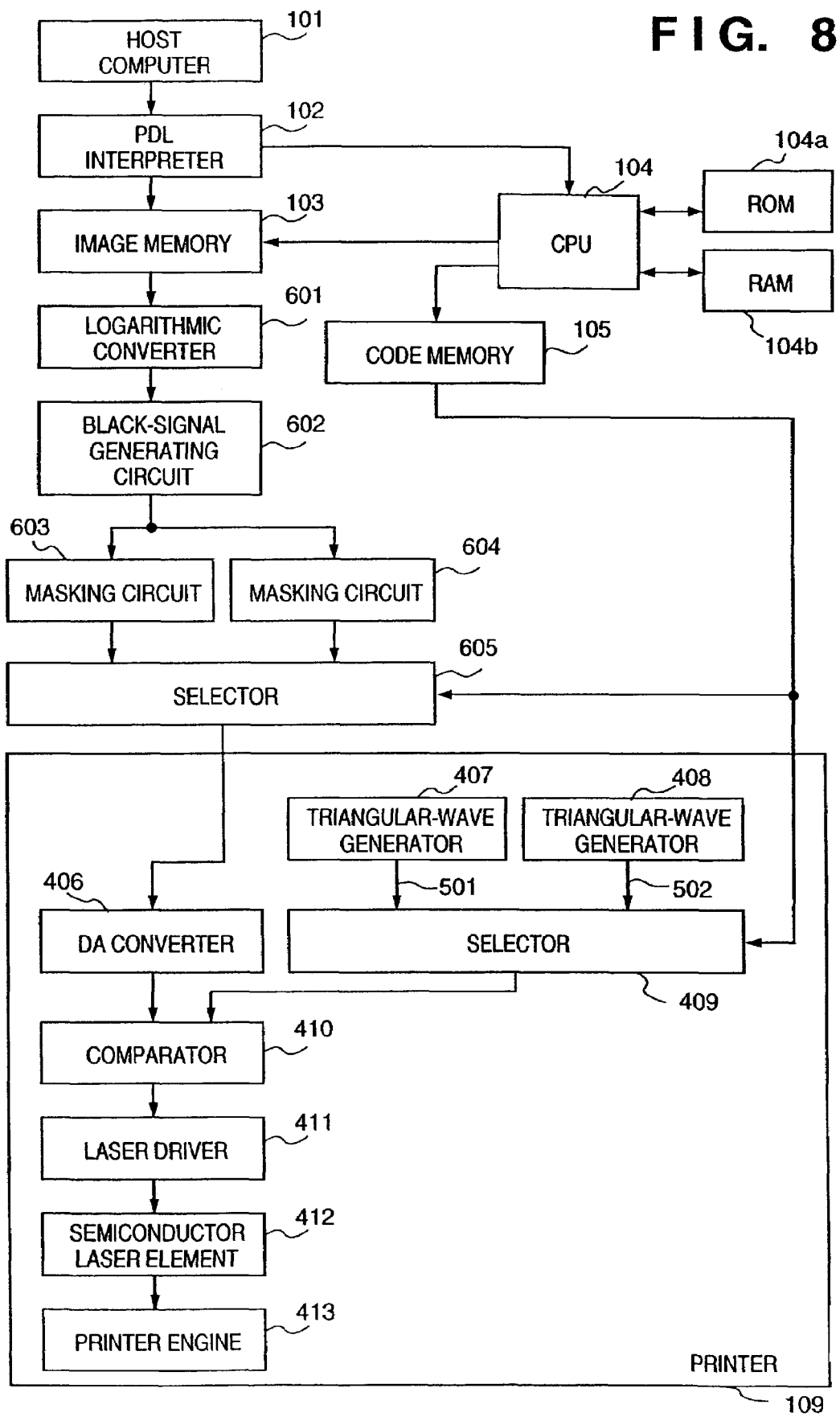
FIG. 8 is a block diagram showing the construction of an image processing system according to a third embodiment of the present invention.
Figure 9:
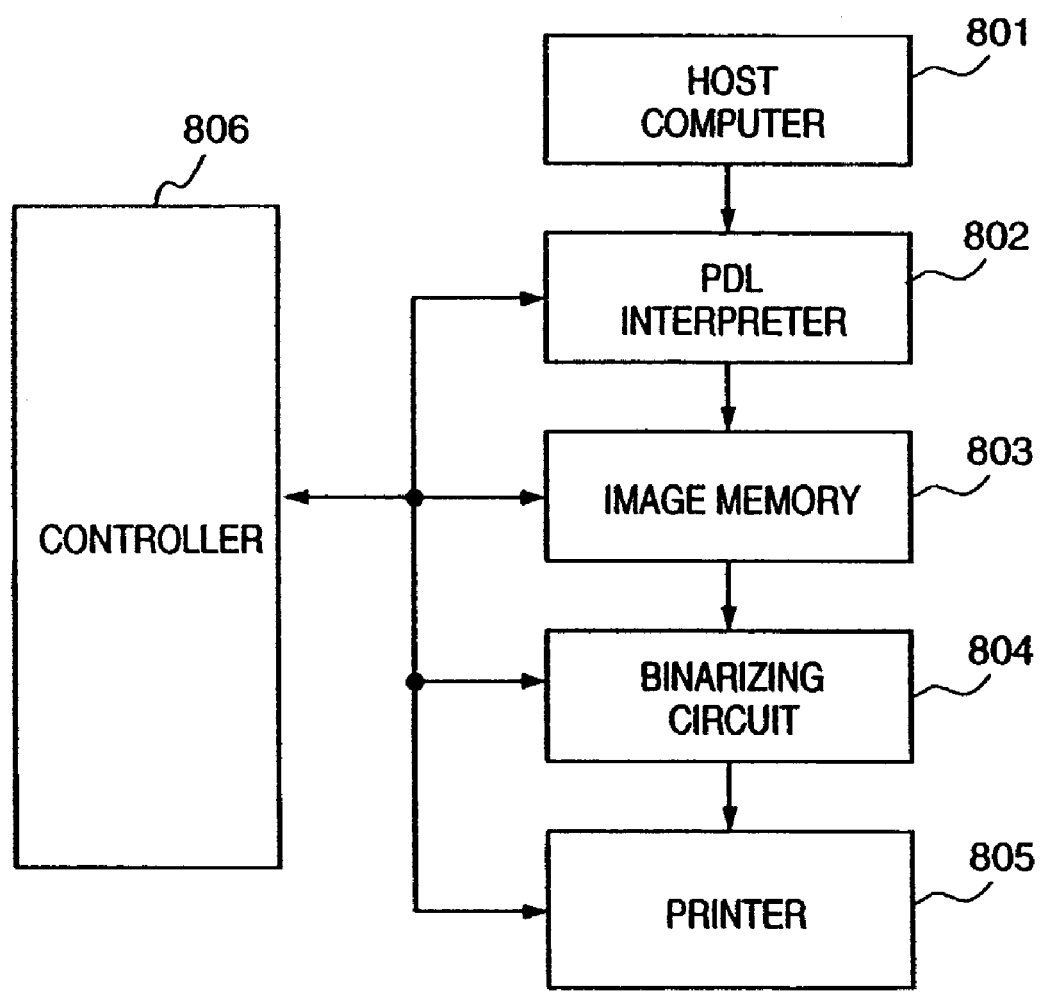
FIG. 9 is a block diagram showing the construction of an ordinary image processing system.
Figure 10:
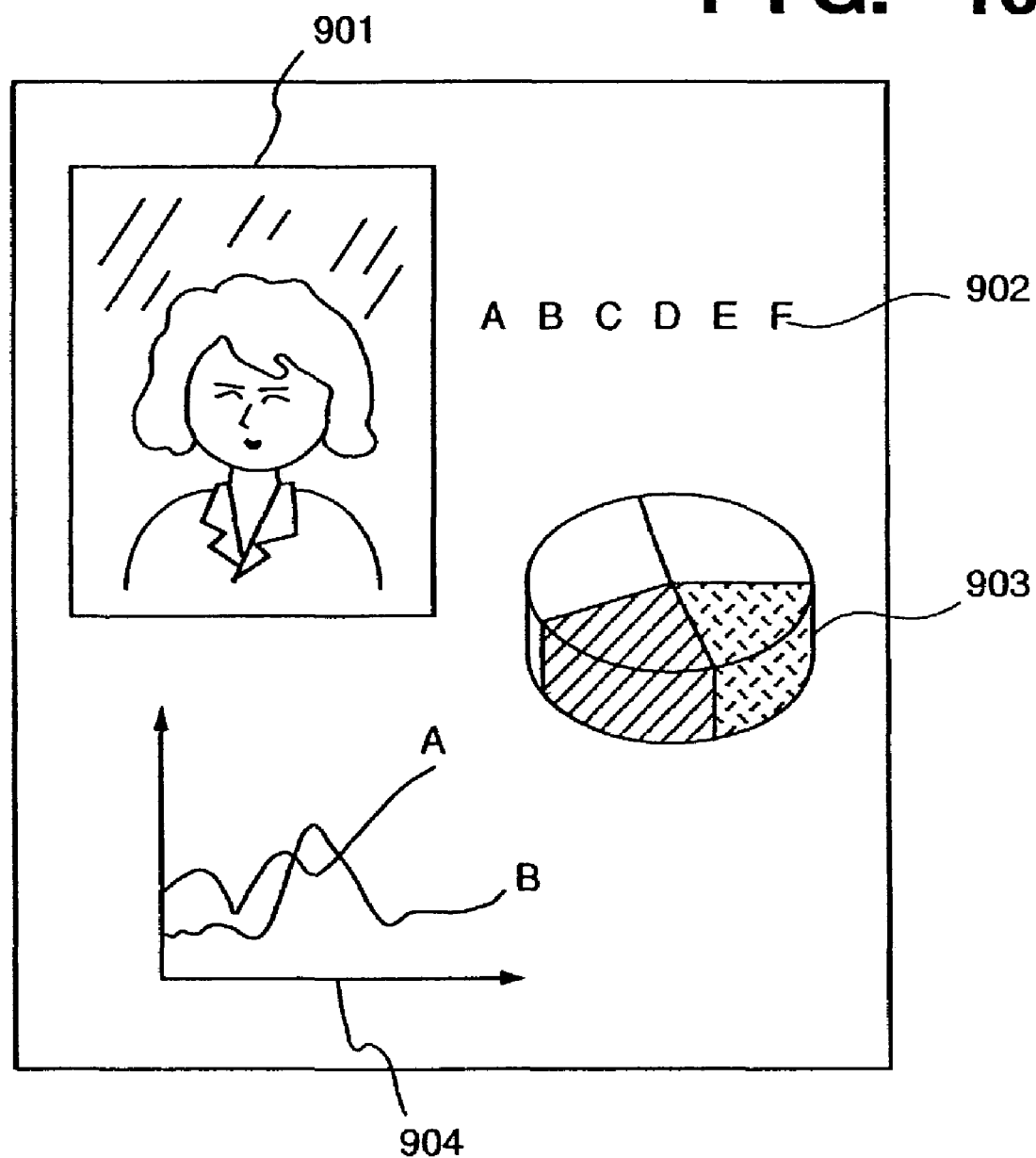
FIG. 10 is a diagram showing an example of a document which is a mixture of images having various characteristics.

FIG. 8 is a block diagram showing the construction of an image processing system according to a third embodiment of the present invention.

Elements identical with those of the first and second elements are designated by like reference characters and need not be described again in detail.

A laser-beam printer is used as the printer 109 in the third embodiment as well. However, the laser-beam printer of this embodiment is capable of outputting a full-color image. Accordingly, color-image data (R, G, B raster-image data) are stored in the image memory 103. With regard to formation of the image by the semiconductor laser element 412, the color-component images of the four color components yellow (Y), magenta (M), cyan (C) and black (K) are formed field-sequentially to produce a hard copy of a color image.

Though the details will be described below, it is required that the code memory 105 according to this embodiment have a storage capacity of at least two bits per pixel.

The embodiment shown in FIG. 8 has color processing circuits 601~604 for generating Y, M, C, K data from R, G, B color image data. Specifically, a logarithmic converter circuit 601, which converts R, G, B luminance signals to density signals C, M, Y, performs the conversion represented by the following equations:

$$c = -\log_{10} R$$

$$m = -\log_{10} G \quad (2)$$

$$y = -\log_{10} B$$

A black-signal extraction circuit 602, which executes the operation of Equation (3) below, extracts the minimum value of the three density signals and adopts this value as the black signal K.

$$k = \text{Min}(c, m, y) \quad (3)$$

So-called masking conversion circuits 603, 604 convert the c, m, y, k signals, obtained above, to C, M, Y, K signals for image formation. The conversion is in accordance with the following matrix:

$$\begin{bmatrix} C \\ M \\ Y \\ K \end{bmatrix} = \begin{bmatrix} b11 & b21 & b31 & b41 \\ b12 & b22 & b32 & b42 \\ b13 & b23 & b33 & b43 \\ b14 & b24 & b34 & b44 \end{bmatrix} \begin{bmatrix} c \\ m \\ y \\ k \end{bmatrix} \quad (4)$$

The reason for providing two masking circuits is to set both to different conversion coefficients $b_{ij}$, switch between both output signals using a selector 605 through a method described below and delivering the selected signal to the printer 109.

The operation of the third embodiment will now be described in detail.

Figure 11:
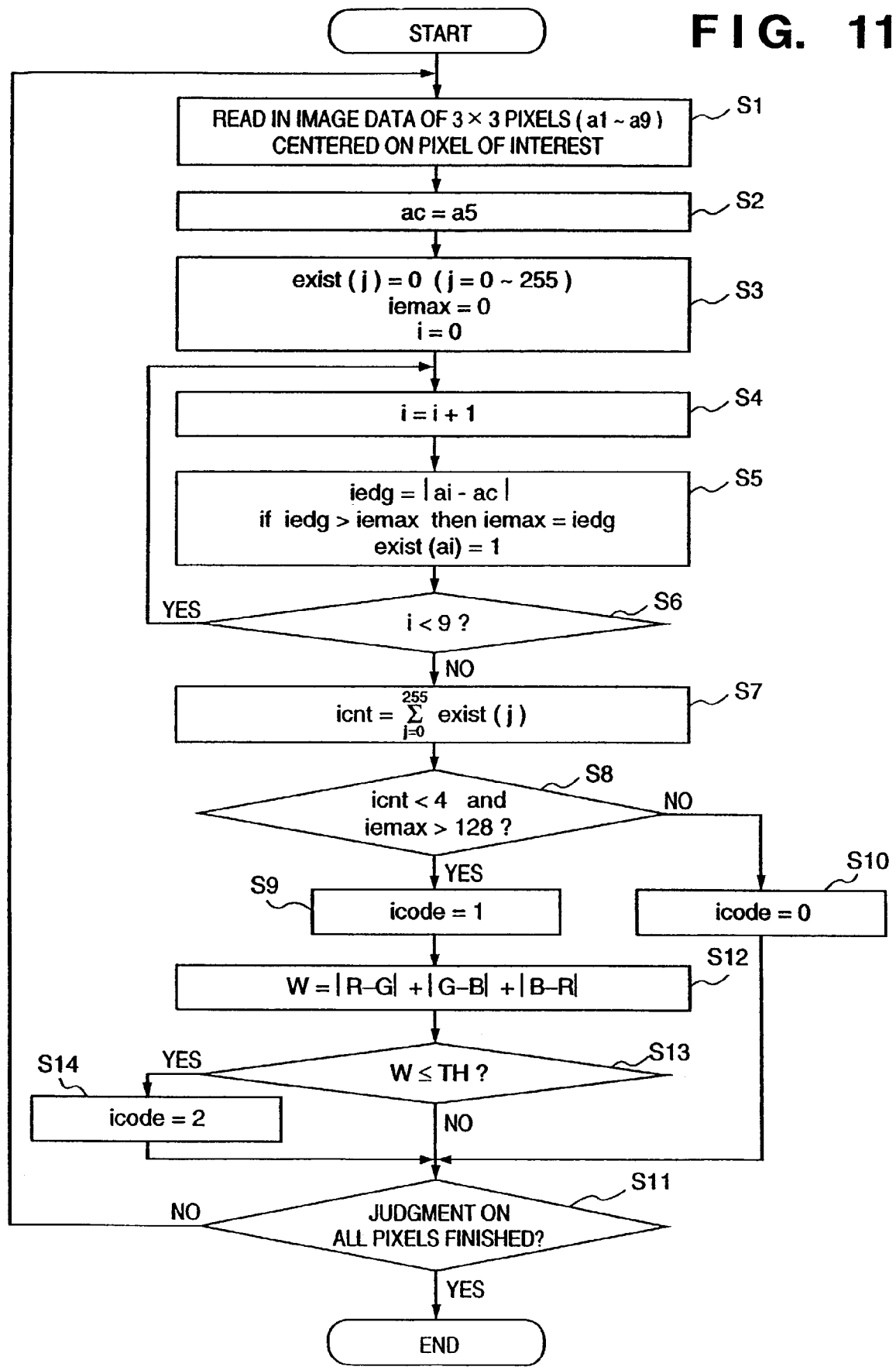
FIG. 11 is a flowchart showing processing for discriminating the type of an image according to the third embodiment.

FIG. 11 is a flowchart showing processing for discriminating the type of an image according to the third embodiment.

In a manner similar to that of the first embodiment, the CPU 104 executes steps S1 through S10 to write code information icode, which corresponds to the raster image stored in the image memory 103, in the code memory 105. The determination as to whether an area is a character/line-drawing area or continuous grayscale image area can be executed by applying processing similar to that of the first embodiment to image data of the color G (green) stored in the image memory 103.

Next, with regard to a pixel (icode=1) determined to be in a character/line-drawing area, the CPU 104 reads in the R, G, B image data of this pixel and obtains saturation information W in accordance with the following equation at step S12:

$$W = |R-G| + |G-B| + |B-R| \quad (5)$$

If W if found to be equal to or less than a predetermined threshold value TH ("YES" at step S13), the CPU 104 rewrites the value of icode corresponding to this pixel from 1 to 2. The fact that W is equal to or less than TH means that the values of R, G, B of the pixel of interest are close to one another and represent near a chromaticity. As a result, a pixel for which 2 has been written as the icode resides in a character/line-image area which is achromatic (black).

With regard to the coefficients set in the masking circuits 603 and 604, a coefficient for which emphasis is placed on the color reproducibility of the image to be reproduced is set in the masking circuit 603, and a coefficient for which the output Y, M, C signals always become 0 and only the black signal K has a value is set in the masking circuit 604. It is so arranged that the selector 605 selects the output of the masking circuit 604 if icode is 2 and selects the output of the masking circuit 603 in all other cases. As a result, the image data of a pixel in a black character/line-drawing area is outputted as the color black, and image data of all other image areas are outputted as image data having a color reproducibility faithful to that of the original image data.

As in the second embodiment, image data outputted by the selector 605 enter the printer 109, the data are converted to the corresponding analog signal by the DA converter circuit 406 and the analog signal enters one input terminal of the comparator 410. The triangular wave selected by the selector 409 in accordance with icode enters the other input terminal of the comparator 410, just as in the second embodiment. In the third embodiment, however, icode is rewritten to 2 in case of a black character/line-drawing area. Therefore, the selector 409 selects the triangular wave 501 when icode is 1 or 2 and the triangular wave 502 when icode is 0.

Figure 26:
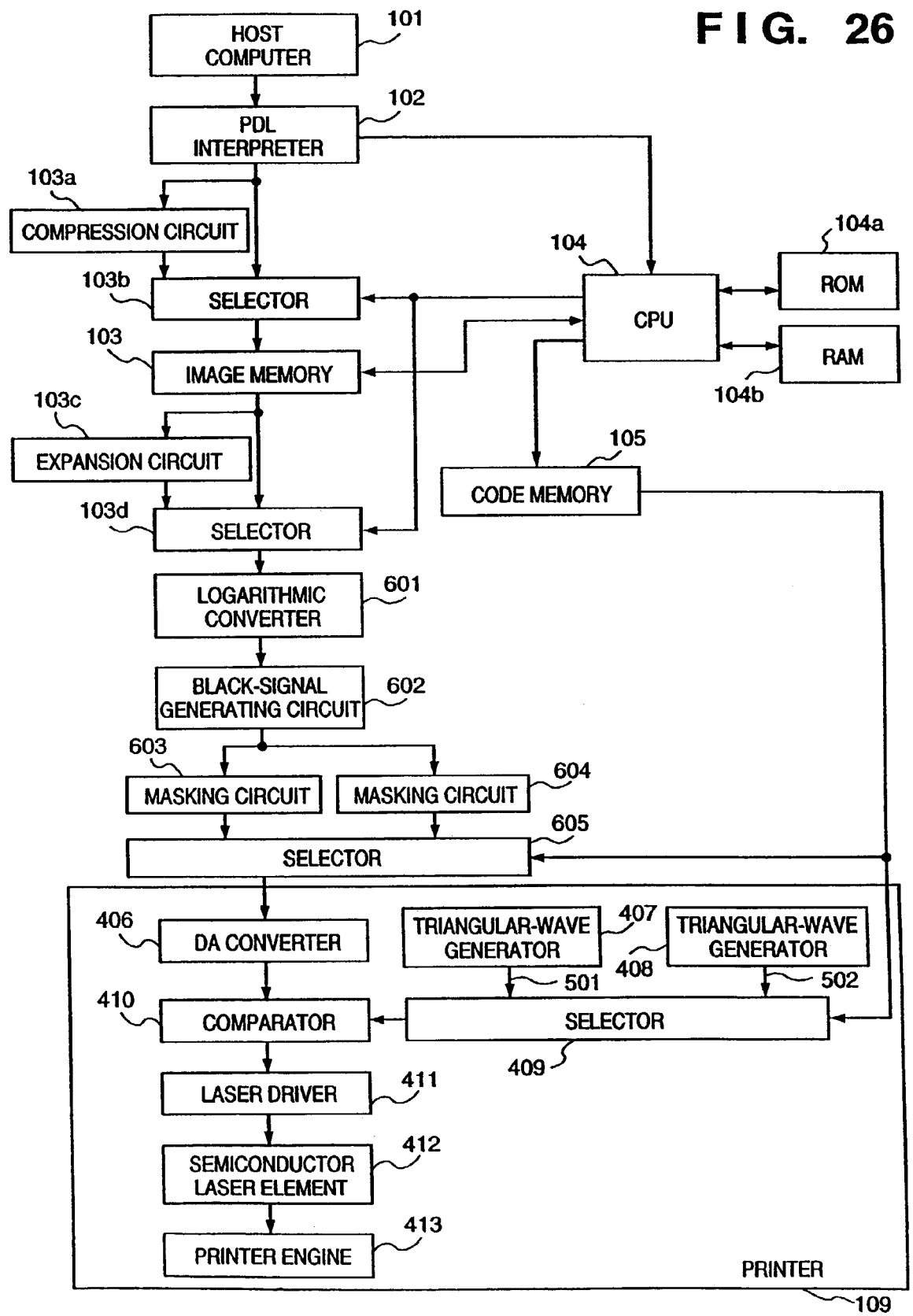
FIG. 26 is a block diagram illustrating the construction of a modification of the third embodiment.

Thus, in accordance with the third embodiment as described above, it is so arranged that if an image containing a mixture of images having different characteristics is outputted as a hard copy by means of a color printer, character/line-drawing areas and continuous grayscale image areas are precisely detected, black character/line-drawing areas are precisely detected, and image processing and resolution conforming to the type of image is selected. This makes it possible to obtain a high-quality hard copy.

Modification of Third Embodiment FIG. 26 is a block diagram showing a modification of the third embodiment. This modification has the same construction shown in FIG. 8, and provides a function of selecting a compression mode or a non-compression mode, similar to the modification of the first embodiment. Accordingly, the difference from FIG. 8 is the same as that in the modification of the first embodiment described using FIG. 24, therefore, the explanation of this modification will be omitted.

In each of the foregoing embodiments, the invention is described with regard to two types of printers, namely an ink-jet printer and a laser-beam printer. However, the invention can be similarly applied to other printing methods as well. Further, an example is described in which an image is separated into two types, namely a character/line-drawing image and a continuous grayscale image. However, this does not impose a limitation upon the invention. An arrangement in which an image is classified into a number of image types and image processing and output resolution conforming to the types of images are controlled individually also falls within the scope of the present invention.

Fourth Embodiment

Figure 12:
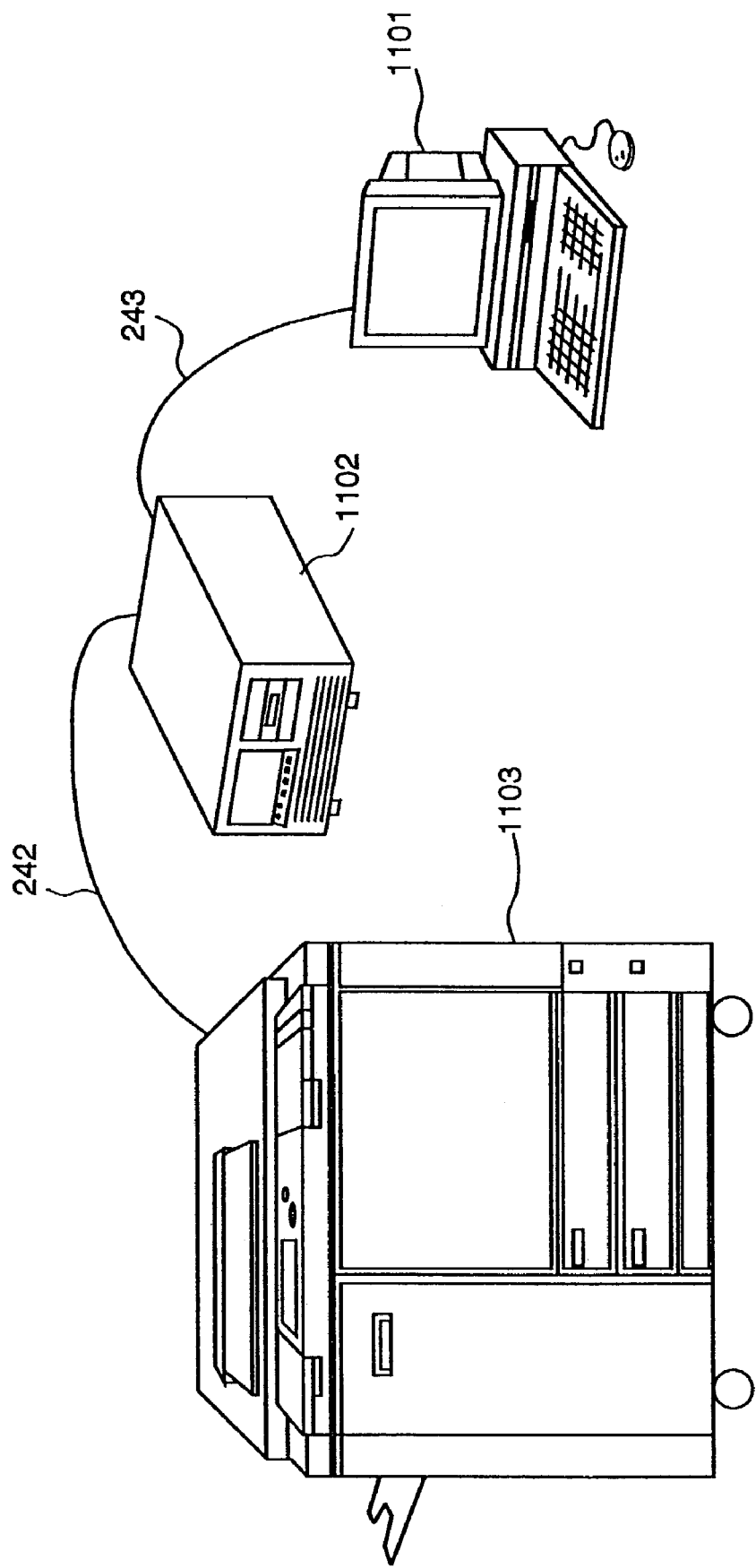
FIG. 12 is a perspective view showing a full-color copier system according to a fourth embodiment of the present invention.

FIG. 12 is a block diagram showing the construction of an image processing system according to a fourth embodiment of the present invention. Though a full-color copier system is described as the fourth embodiment, the invention is not limited to this embodiment.

[Overview of Apparatus]

FIG. 12 is a perspective view showing a full-color copier system according to the fourth embodiment of the present invention. The system includes a host computer 1101, a controller 1102 and an image forming apparatus 1103 having a reader section and a printer section.

The image forming apparatus 1103 produces a full-color copy of the image of a document placed upon a platen and outputs a color image sent from the computer 1101 via the controller 1102. The host computer 1101 runs application software for so-called desktop publishing (DTP), thereby creating or editing various documents and graphics. The host computer 1101 converts the created document or graphics to PDL data, which is described by page description language (PDL) such as Adobe System's PostScript, and sends the PDL data to the controller 1102 via a connector cable 243. The controller 1102 translates the PDL data sent from the host computer 1101 and rasterizes the PDL data to an image signal pixel by pixel. The rasterized image signal is sent to the image forming apparatus 1103 via the connector cable 242. The image forming apparatus 1103 outputs the image.

The host computer 1101, controller 1102 and image forming apparatus 1103 are capable of communicating data with one another and in both directions.

[Overview of Image Forming Apparatus]

Figure 13:
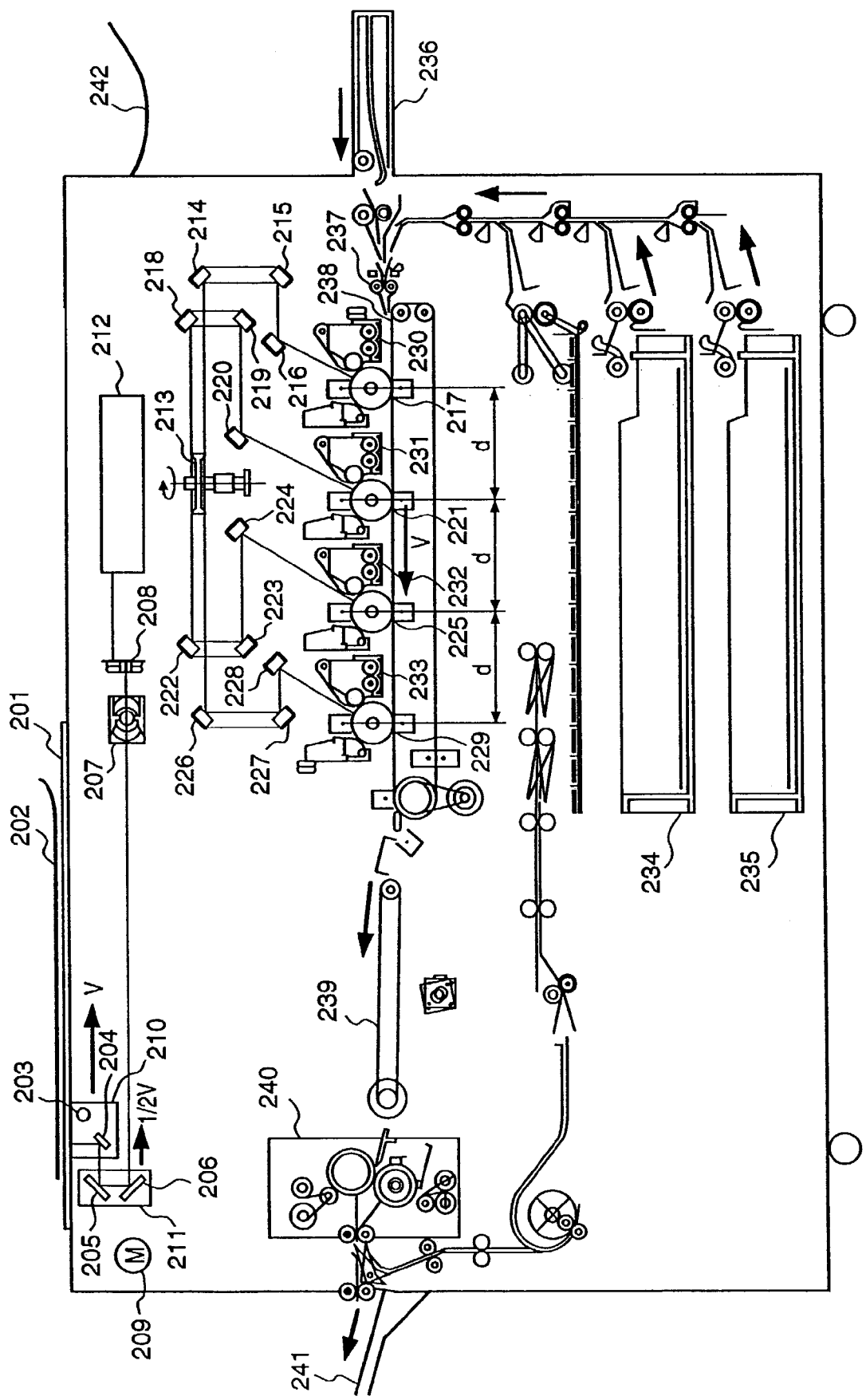
FIG. 13 is a schematic view showing an image forming apparatus illustrated in FIG. 12.

FIG. 13 is a schematic view showing the image forming apparatus 1103 illustrated in FIG. 12.

When Apparatus is used as Copier for Copying document image

A document 202 placed on a glass platen 201 is irradiated with light from an illuminator 203. Light reflected from the document 202 is reflected-by mirrors 204, 205, 206 and the image thereof is formed an image on a CCD sensor 208 by an optical system 207. A first mirror unit 210, which includes the mirror 204 and illuminator 203, is mechanically driven at a velocity V by a motor 209, and a second mirror unit 211, which includes the mirrors 205, 206, is mechanically driven at a velocity ½V by the motor 209, thereby scanning the full surface of the document 202.

An image processor 212 processes the image information from the CCD sensor 208 as an electric signal, stores the processed signal in a memory 1108 (described later) temporarily and then outputs the signal as a print signal. The print signal outputted by the image processor 212 is sent to a laser driver (not shown) to drive four semiconductor laser elements (not shown). One of the laser beams emitted by the four semiconductor laser elements is caused to scan by a polygon mirror 213 so that a latent image is formed on a photosensitive drum 217 via mirrors 214, 215, 216. The other laser beams also are caused to scan by the polygon mirror 213, a latent image is formed on a photosensitive drum 221 via mirrors 218, 219, 220, a latent image is formed on a photosensitive drum 225 via mirrors 222, 223, 224, and a latent image is formed on a photosensitive drum 229 via mirrors 226, 227, 228.

Thus, latent images are formed on respective ones of the photosensitive drums. The latent images are developed by respective ones of a developing unit 230 which supplies yellow (Y) toner, a developing unit 231 which supplies magenta (M) toner, a developing unit 232 which supplies cyan (C) toner and a developing unit 233 which supplies black (K) toner. The developed toner images of the four colors are transferred to recording paper to obtain a full-color output image.

Recording paper supplied from recording-paper cassettes 234, 235 or from a manual-insertion tray 236 is attracted to a transfer belt 238 and conveyed by resistance rollers 237. Toner images of the respective colors are developed on the photosensitive drums 217, 221, 225, 229 in advances and are transferred to the recording paper, as the recording paper is conveyed, in sync with the timing of paper feed. The recording paper to which the four-color toner images have been transferred is separated from the transfer belt 238 and conveyed by a conveyor belt 239. The toners are fixed by a fixing unit 240 and discharged into a paper-discharge tray 241.

The four photosensitive drums are arranged at an equal spacing d and the recording paper is conveyed at a constant velocity V by the transfer belt 238. Accordingly, the four semiconductor laser elements are driven at a timing in sync with the velocity of paper conveyance.

Output of image sent from host computer 1101

An image outputted by the host computer 1101 is transferred directly to an image memory 1109 in the controller 1102 through an interface cable 243, after which an image is formed through an operation similar to the copying operation.

[Flow of Image Signals]

Figure 14:
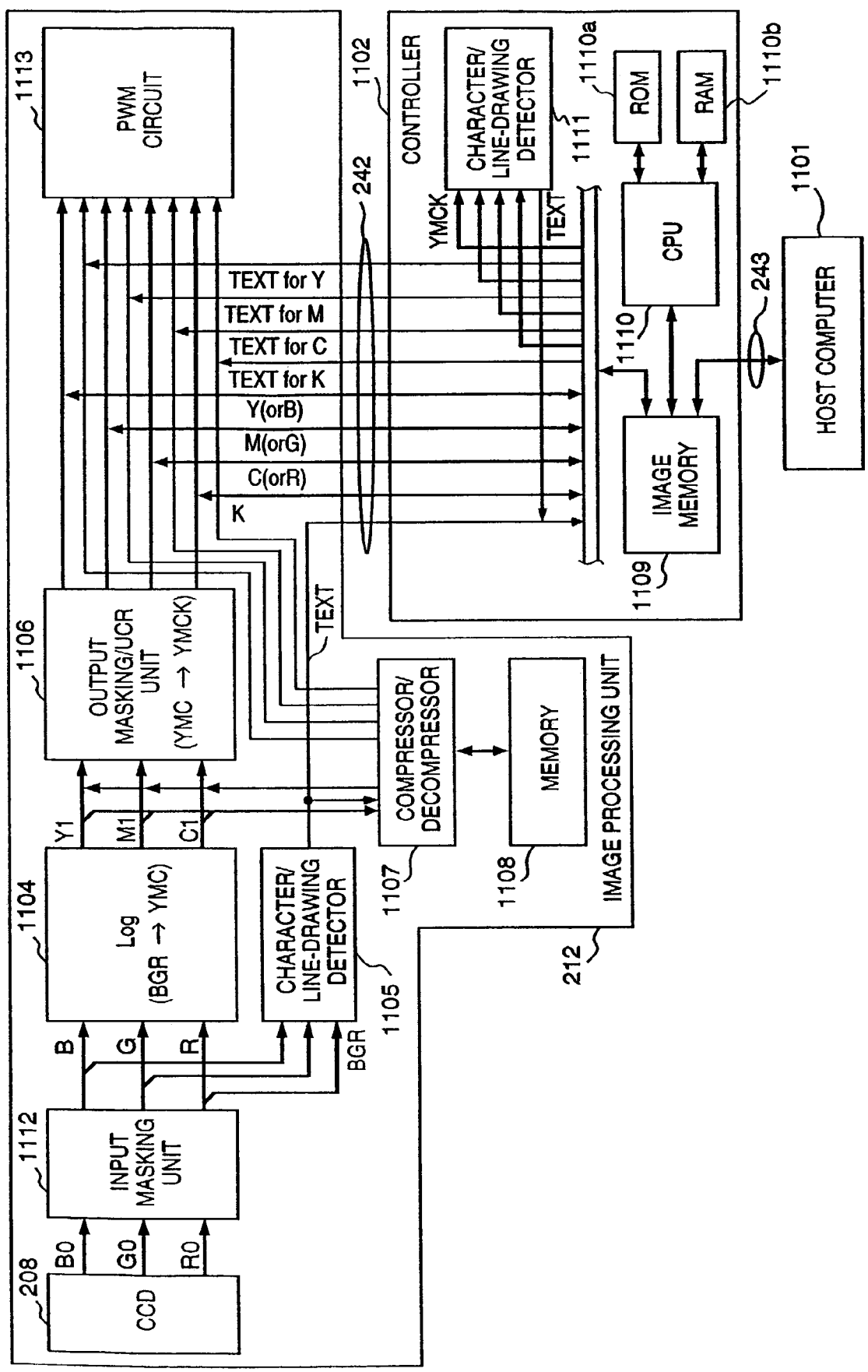
FIG. 14 is a block diagram showing the flow of image signals.

FIG. 14 is a block diagram showing the flow of image signals.

Image Processor 212

The image information representing the document 202 is converted to image signals of the three color components red (R), green (G) and blue (B) by the CCD sensor 208 and these are outputted as the corresponding digital signals B0, G0, R0.

An input masking unit 1112 performs the operation indicated by the equation below to convert the entered signals B0, G0, R0 to colors in standard RGB color space. In the following equation, $c_{ij}$ (i=1, 2, 3; j=1, 2, 3) represents a constant, specific to the apparatus, which takes into account such characteristics as the sensitivity characteristic of the CCD sensor 208 and the spectral characteristic of the illuminator 203.

$$\begin{bmatrix} R \\ G \\ B \end{bmatrix} = \begin{bmatrix} C11 & C21 & C31 \\ C21 & C22 & C23 \\ C31 & C32 & C33 \end{bmatrix} \begin{bmatrix} R0 \\ G0 \\ B0 \end{bmatrix} \quad (6)$$

A luminance/density converter 1104, which is constituted by a RAM or ROM look-up table, performs the operation indicated by the following equation:

$$C1 = -F \cdot \log_{10}(R/255)$$

$$M1 = -F \cdot \log_{10}(G/255) \quad (7)$$

$$Y1 = -F \cdot \log_{10}(B/255)$$

where F is a constant.

An output masking/UCR unit 1106 performs the operation indicative by the equation below to convert the M1, C1, Y1 signals to Y, M, C, K signals representing the toner colors of the image forming apparatus 1103. In the following equation, aij (i=1, 2, 3, 4; j=1, 2, 3, 4) represents a constant, specific to the apparatus, which takes into account the tinge characteristics of the toners.

$$\begin{bmatrix} C \\ M \\ Y \\ K \end{bmatrix} = \begin{bmatrix} a11 & a21 & a31 & a41 \\ a12 & a22 & a32 & a42 \\ a13 & a23 & a33 & a43 \\ a14 & a24 & a34 & a44 \end{bmatrix} \begin{bmatrix} C1 \\ M1 \\ Y1 \\ K1 \end{bmatrix} \quad (8)$$

where $K1 = \min(C1, M1, Y1)$ (9)

Thus, the R0, G0, B0 signals outputted by the CCD sensor 208 are converted to Y, M, C, K signals, which conform to the spectral distribution_characteristics of the toners, in accordance with Equations (6) through (9), and the Y, M, C, K signals are outputted output masking/UCR unit 1106.

A character/line-drawing detector 1105 determines whether each pixel in the image of the original is part of a character or line drawing and generates a decision signal TEXT. A compressor/decompressor 1107 compresses the C1, Y1, M1 image signals and the decision signal TEXT to reduce the amount information and subsequently stores the compressed signals in a memory 1108. The compressor/decompressor 1107 also decompresses data read out of the memory 1108 and reproduces the C1, Y1, M1 image signals and the decision signal TEXT.

Controller 110

On the basis of a program stored in a program ROM 1110a, a CPU 1110 controls the overall controller 1102 and converts PDL data using a RAM 1110b and a buffer.

The Y, M, C, K signals conforming to the spectral distribution characteristics of the toners are stored in an image memory 1109 through the cable 242, these signals are read out in sync with the image formation timing on the copier side and the signals read out are sent to a PWM circuit 1113 (described later) which forms a PWM signal for driving the semiconductor lasers. Further, there are cases where the image memory 1109 stores not only the Y, M, C, K signals but also the R, G, B signals outputted by the host computer 1101 and the R, G, B signals outputted by the input masking unit 1112 [in this instance, parameters for outputting the input signals unchanged (for allowing the input signals to pass through) are set in the luminance/density converting unit 1104 and output masking/UCR unit 1106].

Numeral 1111 denotes a character/line-drawing detector, which will be described later.

[Copier Operation]

The system of this embodiment is capable of operating as a simple copier (this shall be referred to as "copier operation" below) and as an overall system ("system operation"), which includes the controller 1102. Copier operation will be described first.

Figure 15:
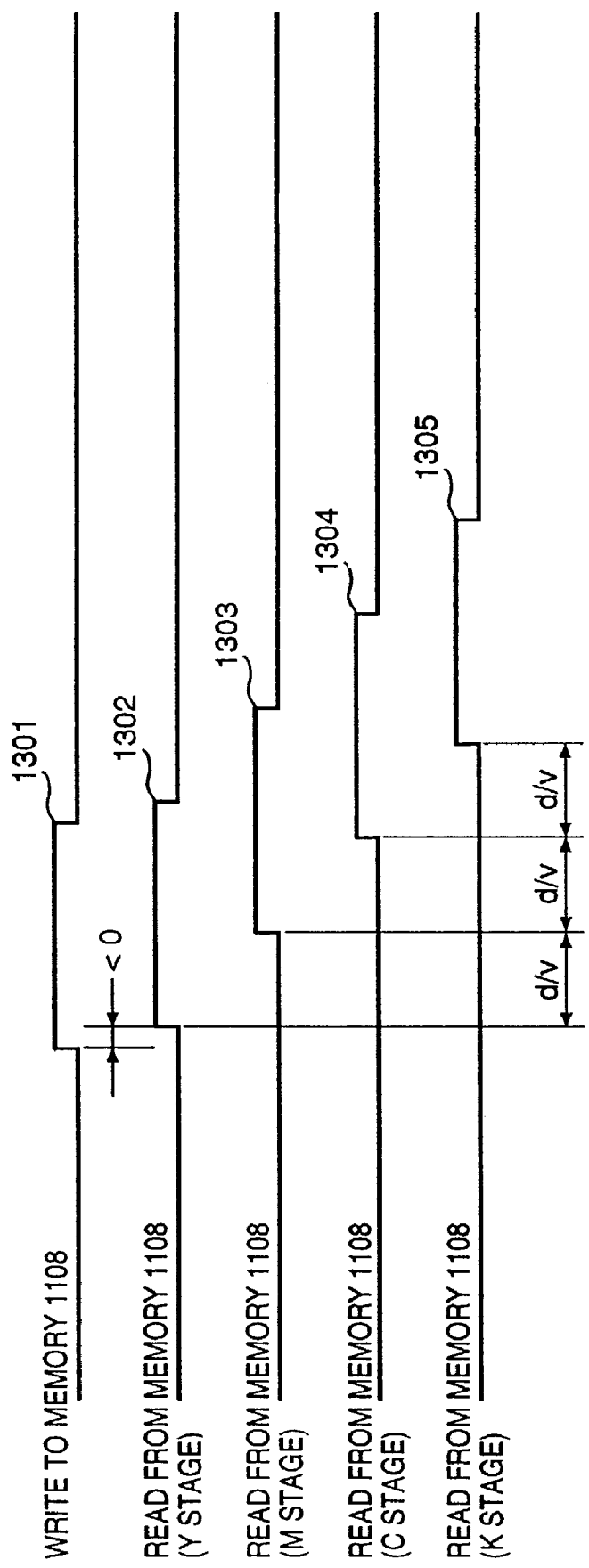
FIG. 15 is a diagram illustrating write/read timing of image data in a copier operation.

In case of copier operation, the image signals outputted by the CCD sensor 208 are acted upon by the input masking unit 1112 and luminance/density converter 1104 and compressed by the compressor/decompressor 1107, after which the compressed data are written in the memory 1108. The decision signal TEXT outputted by the character/line-drawing detector 1105 also is compressed by the compressor/decompressor 1107 and then written in the memory 1108. Data read-out of the memory 1108 is decompressed by compressor/decompressor 1107 and sent to the laser driver through the PWM circuit 1113 (described below) in sync with the timing at which the image is formed on the copier side. FIG. 15 is a diagram illustrating write/read timing of image data in the copier operation.

As shown in FIG. 15, an image signal is written in the memory 1108 at the timing 1301 and image signals are read out of the memory 1108 at timings 1302~1305. It will be seen that the timings 1302~1305 are spaced apart by the time d/V. In other words, the start of readout between one signal and the next is separated by the interval d/V. As mentioned above, d represents the spacing of the four photosensitive drums, which are arranged at equal intervals, and V represents velocity at which the transfer belt 238 is conveyed. Further, it goes without saying that the timing 1302 at which readout of the Y stage starts is later than the timing 1301 at which wring starts.

[System Operation]

System operation is classified broadly into scanning operation, PDL developing operation, character/line-drawing extraction operation and printout operation.

Scanning Operation

This is an operation through which the image signal obtained by reading the original is fed into the controller 1102. RGB data or YMCK data are stored in the image memory 1109. In a case where RGB data are read in, these data pass through the luminance/density converter 1104 and output masking/UCR unit 1106, as described earlier, Thus, the RGB data and YMCK data can be accepted on a shared line.

PDL Converting Operation

This is an operation through which the PDL data that have entered from the host computer 1101 are converted to a full-color image and the full-color image is written in the image memory 1109. The full-color image are developed as image data, which have been separated into the four colors Y, M, C, K, in conformity with the output characteristics (density characteristic and color reproducibility characteristic) possessed by the image forming apparatus 1103.

Character/line-drawing Extracting Operation

This is an operation through which full-color image data developed and written in the image memory 1109 are read out and the data are discriminated, with regard to each portion of the full-color image, to determine whether the data are indicative of a character/line-drawing portion. The character/line-drawing detector 1111 determines whether each portion of the full-color image read out of the image memory 1109 indicates a character/line-drawing portion, and writes the decision signal TEXT, which indicates the result of the determination, in the image memory 1109.

Printout Operation

This is an operation through which the full-color image data and decision signal TEXT stored in the image memory 1109 are read out in sync with the rotation of the four photosensitive drums and sent to the PWM circuit 1113, described later. The image is outputted.

Operation Timing

Figure 16:
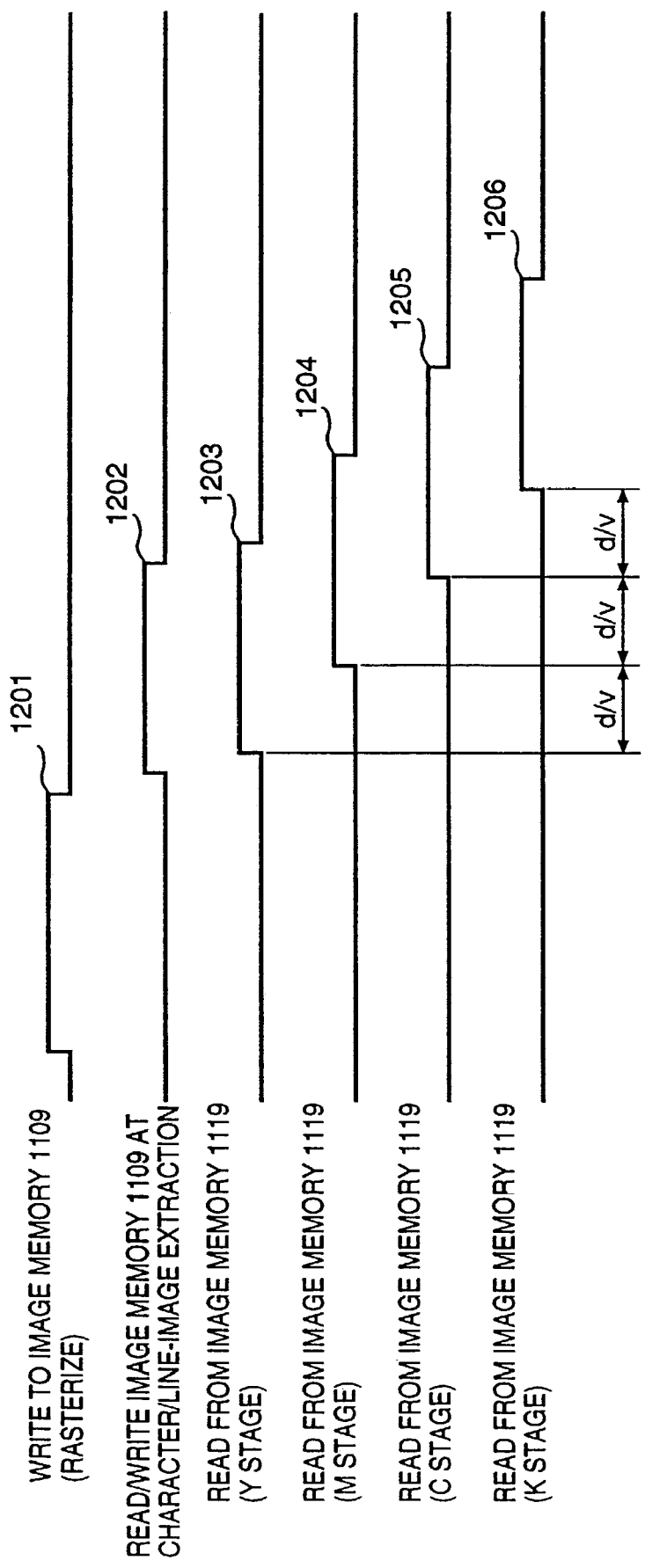
FIG. 16 is a diagram illustrating write/read timing of image data in system operation.

FIG. 16 is a diagram illustrating write/read timing of the image data in system operation. The scanning operation or the PDL data conversion operation is carried out over a time period 1201 and the operation for writing data in the image memory 1109 is performed simultaneously. The image data that have been written in the image memory 1109 undergo extraction of character/line-drawing portions over a time period 1202 and the image data are read out at timings 1203~1206. It will be seen that the timings 1203~1206 are spaced apart by the time d/V. In other words, the start of readout between one signal and the next is separated by the interval d/V.

The characterizing feature of this embodiment is that the generation of the decision signal TEXT by the character/line-drawing detector 1111, the operation for recording the generated decision signal TEXT in the image memory 1109 and the readout of the full-color image data and decision signal TEXT are carried out simultaneously (in parallel), thereby making it possible to execute processing at a higher speed than when these operations are performed one after the other. Control for the simultaneous processing of these operations is performed by the CPU 1110. In other words, the CPU 1110 is capable of performing the operations for writing data to and reading data from the image memory 1109 in time-shared fashion.

[Character/Line-Drawing Detector]

Figure 17:
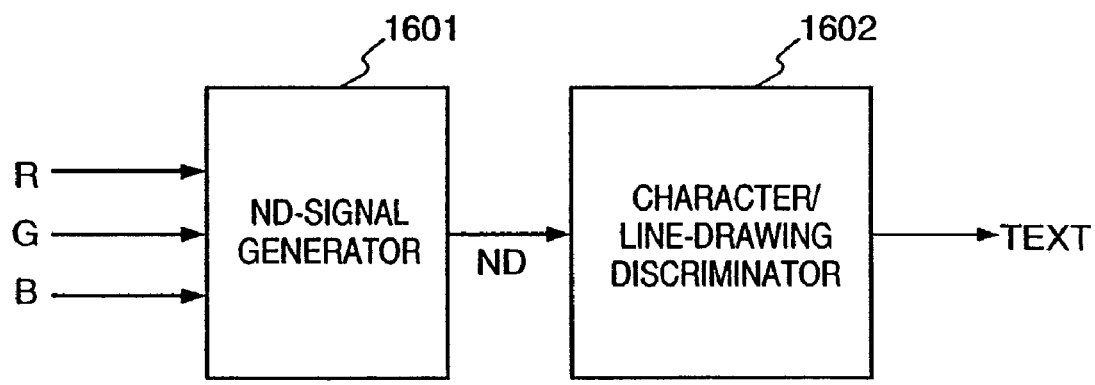
FIGS. 17 and 18 are block diagrams illustrating the construction of a character/line-drawing detector shown in FIG. 14.

FIG. 17 is a block diagram showing the construction of the character/line-drawing detector 1105. The character/line-drawing detector 1105 extracts character and line-drawing portions from the RGB image signal obtained by reading the original and generates the decision signal TEXT whose logic level is "1" when the pertinent pixel forms a character or line drawing and "0" when the pixel forms a portion other than a character or line drawing.

In FIG. 17, an ND-signal generator 1601 performs the operation indicated by the equation below to generate an ND signal, which is a lightness signal that takes into account the spectral luminous efficacy of the human eye, from the full-color RGB image signal. It should be noted that d1, d2, d3 in the following equation represent constants which take into account the spectral luminous efficacy of the human eye:

$$ND = \begin{bmatrix} d1 & d2 & d3 \end{bmatrix} \begin{bmatrix} R \\ G \\ B \end{bmatrix} \quad (10)$$

A character/line-drawing discriminator 1602 extracts a character/line-drawing portion from the lightness signal ND and generates logical "1" when the pertinent pixel forms a character or line drawing and "0" when the pixel forms a portion other than a character or line drawing. This type of circuit is well-known and a detailed description thereof is not required.

Figure 18:
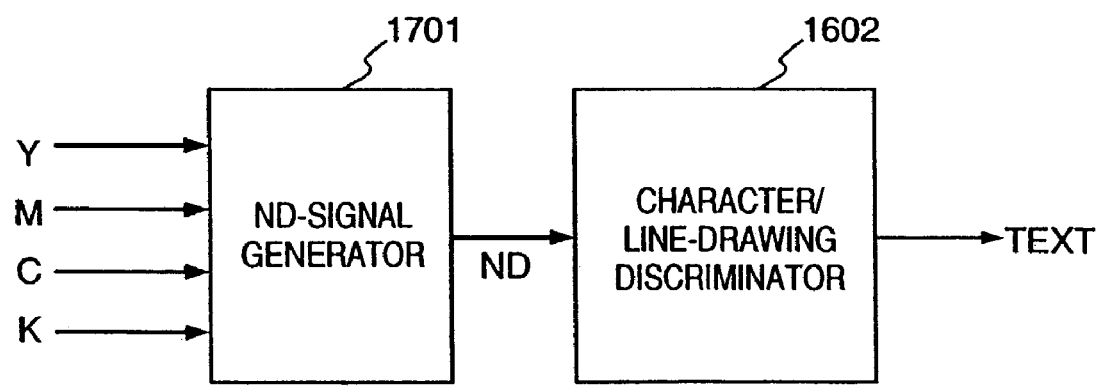

Similarly, FIG. 18 is a block diagram showing the construction of the character/line-drawing detector 1111. The character/line-drawing detector 1111 extracts character and line-drawing portions from the YMCK image signal and generates the decision signal TEXT whose. logic level is "1" when the pertinent pixel forms a character or line drawing and "0" when the pixel forms a portion other than a character or line drawing.

In FIG. 18, an ND-signal generator 1701 performs the operation indicated by the equation below to generate an ND signal, which is a lightness signal that takes into account the spectral luminous efficacy of the human eye, from the full-color YMCK image signal. It should be noted that e1, e2, e3, e4 in the following equation represent constants which take into account the spectral luminous efficacy of the human eye:

$$ND = \begin{bmatrix} e1 & e2 & e3 & e4 \end{bmatrix} \begin{bmatrix} Y \\ M \\ C \\ K \end{bmatrix} \quad (11)$$

Further, the character/line-drawing-discriminator 1602 is the same as the character/line-drawing discriminator 1602 shown in FIG. 17.

[Decision Signal TEXT]

FIGS. 19A through 19C are diagrams for describing the decision signal TEXT. Numeral 1401 denotes an example of an original to be read or an image to be printed out. And numeral 1402 denotes an image in which the decision signal TEXT in image 1401 is indicated in two dimensions. More specifically, a character/line-drawing portion in image 1401 is indicated by "black" in image 1402 and other portions are indicated by "white". Numeral 1403 denotes an image in which a portion of image 1402 is enlarged. Pixels indicated by the black circles at 1404 are those which form a character/line-drawing portion. The TEXT signal is "1" for these pixels. On the other hand, pixels indicated by the white circles at 1405 are those which form a portion other than a character/line-drawing portion. The TEXT signal is "0" for these pixels.

[Image Memory]

FIG. 20 is a diagram for describing the structure of data held in the image memory 1109, as well as a method of reading out the data. Numeral 1501 denotes an address map in the image memory 1109. Image data 1502 of the color yellow (Y), image data 1503 of the color magenta (M), image data. 1504 of the color cyan (C), and image data 1505 of the color black (K) each have eight bits of information per pixel. The data 1506 of the decision signal TEXT has one bit of information per pixel.

Numeral 1507 conceptually illustrates how each item of data is read out. Specifically, the Y image data 1502 are read out in sync with the image formation by the photosensitive drum 217, the M image data 1503 are read out in sync with the image formation by the photosensitive drum 221, the C image data 1504 are read out in sync with the image formation by the photosensitive drum 225, AND the K image data 1505 are read out in sync with the image formation by the photosensitive drum 229. The data of the decision signal TEXT are read out in sync with the image formation by all four of the photosensitive drums simultaneously (concurrently) in the four systems.

[PWM Circuit]

Figure 21:
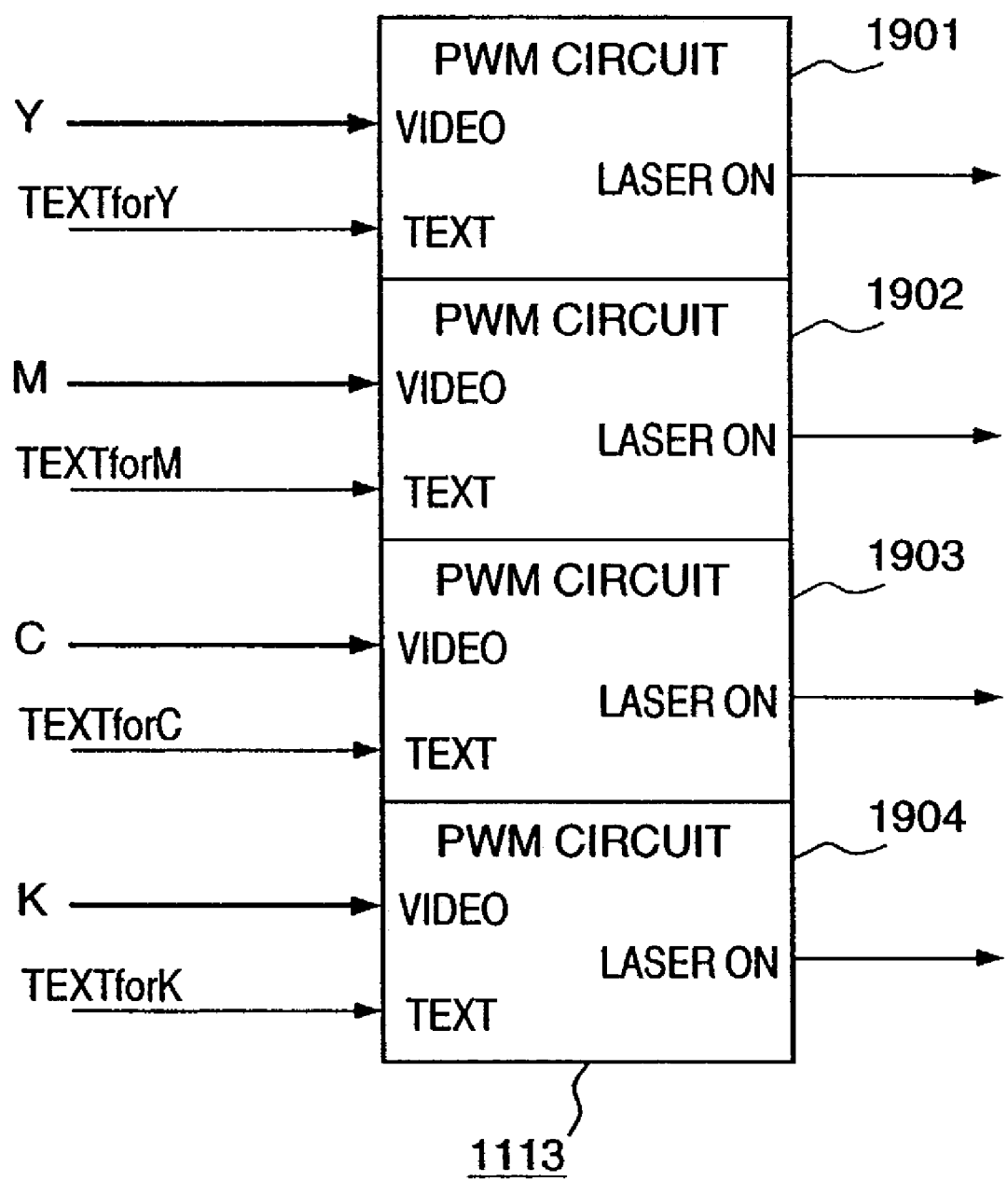
FIG. 21 is a block diagram illustrating the construction of a PWM circuit.

FIG. 21 is a block diagram illustrating the construction of the PWM circuit 1113.

In FIG. 21, the digital image signal for the color yellow (Y) and the decision signal TEXT synchronously enter a PWM circuit 1901 for yellow (Y), and the PWM circuit 1901 generates an analog signal sent to the laser driver to drive the semiconductor laser element for yellow (Y). Similarly, a PWM circuit 1902 for magenta (M), a PWM circuit 1903 for cyan (C) and a PWM circuit 1902 for black (K) are synchronously provided with inputs of the digital image signals of the respective color components and the decision signals TEXT and generate analog signals sent to the corresponding laser drivers to drive the semiconductor laser elements.

Figure 22:
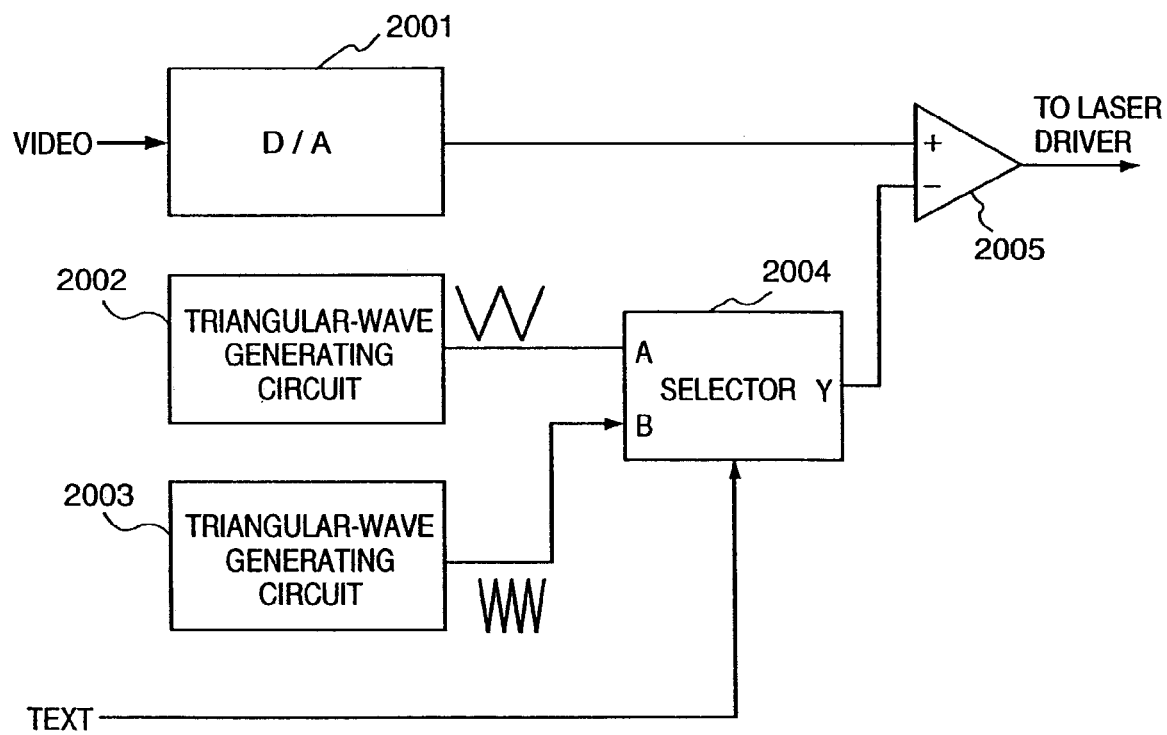
FIG. 22 is a block diagram showing the construction of a PWM circuit for each color component.

FIG. 22 is a block diagram showing the construction of the PWM circuit for each color component. The PWM circuits are identically constructed irrespective of the color components.

As shown in FIG. 22, a D/A converter 2001 converts the input digital image signal to an analog image signal. A triangular-wave generator 2002 for an image in which importance is placed upon tonality generates a triangular wave having a period equivalent to two pixels, and a triangular-wave generator 2003 for an image in which importance is placed upon resolution generates a triangular wave having a period equivalent to one pixel. On the basis of the decision signal TEXT, a selector 2004 selects and outputs either of the two triangular waves having the different periods. More specifically, the selector 2004 selects the number of PWM lines (resolution) based upon the decision signal TEXT. A comparator 2005 compares the analog image signal outputted by the D/A converter 2001 with the triangular wave selected by the selector 2004.

By virtue of the arrangement described above, the triangular wave having the period of one pixel which places importance upon resolution in a character/line-drawing portion is compared with the analog image signal, and the triangular wave having the period of two pixels which places importance upon tonality in a portion other than a character/line-drawing portion is compared with the analog image signal, whereby a pulse-width modulated (PWM) pulse signal is produced. The pulse signal is sent to the laser driver, not shown.

It should be noted that the period of the triangular wave which places emphasis upon tonality is not limited to two pixels. A period of three pixels, four pixels, etc., may be set depending upon the relationship with the resolution of the image forming section.

FIGS. 23A and 23B are examples of a timing chart illustrating the operation of the PWM circuit. The top of FIGS. 23A and 23B illustrate PWM timing for the case where importance is placed upon tonality. Here an output 1801 from the D/A converter 2001 and a triangular wave 1802 having a period of two pixels are compared and the comparator 2005 outputs a pulse signal 1803. The bottom of FIGS. 23A and 23B illustrates PWM timing for the case where importance is placed upon resolution. Here an output 1804 from the D/A converter 2001 and a triangular wave 1805 having a period of one pixel are compared and the comparator 2005 outputs a pulse signal 1806.

In actuality, the pulse signals 1803 and 1806 are switched between and outputted adaptively by the decision signal TEXT which indicates whether each portion of the output image is a character/line-drawing portion in which importance is placed upon resolution or a portion, other than a character/line-drawing portion, in which importance is placed upon tonality. As a result, an excellent image is formed.

Modification of Fourth Embodiment

FIG. 27 is a block diagram showing a modification of the fourth embodiment. In FIG. 27, components having similar functions to those in FIG. 14 have the same reference numerals.

In FIG. 27, reference numeral 1109a denotes a compression/expansion circuit having a function of compressing the above-mentioned YMCK signal and storing the compressed signal into the image memory 1109, and a function of expanding the compressed YMCK signal stored in the image memory 1109. That is, when the CPU 1110 selects the compression mode, the compressed YMCK signal is stored in the image memory 1109. On the other hand, when the CPU 1110 selects the non-compression mode, the YMCK signal which is not compressed is stored into the image memory 1109.

Note that a compression/expansion algorithm used by the compression/expansion circuit 1109a is arbitrary selected and not limited to a specific one. For example, block coding using an orthogonal transfer coding method based on, e.g., so-called JPEG (Joint Photographic Experts Group) standards or a DPCM method using a difference value of each pixel can be employed. In this embodiment, the compression/expansion of image data is performed by a hardware, however, it may be performed by a software.

Further, in the print-out operation of this embodiment, the compressed full-color image signal stored in the image memory 1109 is expanded by the compression/expansion circuit 1109a, then transferred to the character/line-drawing detector 1111 or the PWM circuit 1113. The image data which is not compressed and stored in the image memory 1109 is not expanded before it is transferred to the character/line-drawing detector 1111 or the PWM circuit 1113.

Thus, as described above, regardless of whether an image is one read from an original or one generated by a computer, it is determined whether or not each pixel is one constructing a character/line-drawing portion, and whether importance is placed upon resolution or tonality is selected adaptively pixel by pixel. As a results it is possible to output an image in which importance is placed upon resolution for character/line drawing portions and tonality for portions other than character/line-drawing portions.

Moreover, this operation can be realized in a similar manner not only for an image read by a scanner but also for an input image from a host computer.

Furthermore, the generation of the decision signal regarding a character/line-drawing portion, the operation for recording the generated decision signal in the image memory and the readout of the image data and decision signal are carried out simultaneously (in parallel). As a result, it is possible to execute processing at a higher speed than when these operations are performed one after the other. An image can be outputted at high speed.

Though the feature signal is stored in the image memory 1109 in the controller 1102, a separate memory may be provided for storing the feature signal.

Further, the feature of the image signal represented by the feature signal is not limited to a character or line drawing. Other features may be a black character or line drawing, a photograph or dot pattern.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    a developing means for developing entered image information described in a page description language and storing developed image data for each pixel in first storage means;
    a discriminating means for discriminating a characteristic of an image, pixel by pixel, by referring to the image data that have been stored in said first storage means, and storing a discrimination code representing a result of discrimination in second storage means, wherein said discriminating means performs discrimination processing by referring to image data of an area comprising the pixel of interest and a plurality of pixels surrounding said pixel of interest, and said processing is based upon items of image data having different values present in said area and a maximum value of differences between said pixel of interest and said pixels surrounding said pixel of interest;
    a readout means for reading the image data stored in said first storage means and reading the discrimination code, which corresponds to the image data pixel by pixel, out of said second storage means; and
    a converting means for converting the image data, which have been read out of said first storage means by said readout means, to a pulse-width modulated signal having a period according to the discrimination code read out of said second storage means by said readout means.

2. An image processing method comprising the steps of:
    developing entered image information described in a page description language and storing developed image data for each pixel in a first memory;
    discriminating a characteristic of an image, pixel by pixel, by referring to the image data that have been stored in the first memory, and storing a discrimination code representing a result of discrimination in a second memory, wherein the discriminating step performs discrimination processing by referring to image data of an area comprising the pixel of interest and a plurality of pixels surrounding the pixel of interest, and the processing is based upon items of image data having different values present in the area and a maximum value of differences between the pixel of interest and the pixels surrounding the pixel of interest;
    reading the image data stored in the first memory and reading the discrimination code, which corresponds to the image data pixel by pixel, out of the second memory; and
    converting the image data, which have been read out of the first memory in the reading step, to a pulse-width modulated signal having a period according to the discrimination code read out of the second memory in the reading step.

* * * * *

UNITED STATES PATENT AND TRADEMARK OFFICE
CERTIFICATE OF CORRECTION

PATENT NO. : 7,103,221 B2  
APPLICATION NO. : 10/291496  
DATED : September 5, 2006  
INVENTOR(S) : Ken-ichi Ohta et al.

It is certified that error appears in the above-identified patent and that said Letters Patent is hereby corrected as shown below:

ON THE TITLE PAGE ITEM [75]:

Inventors, "Ken-ichi Ohta, Kanagawa-ken (JP); Masahiro Funada, Kanagawa-ken, (JP); Yushi Matsukubo, Kanagawa-ken (JP); Junichi Yamakawa, Kanagawa-ken (JP)" should read --Ken-ichi Ohta, Kawasaki (JP); Masahiro Funada, Yokohama (JP); Yushi Matsukubo, Yokohama; Junichi Yamakawa, Kawasaki (JP)--.

ON THE TITLE PAGE ITEM [56] REFERENCES CITED:

Foreign Patent Documents, "JP 55091057 * 7/1980" should be deleted.

COLUMN 3:

Line 11, "developing" should read --a developing--; and  
Line 48, "3' 3" should read --3x3--.

COLUMN 5:

Line 30, "3' 3" should read --3x3--;  
Line 37, "3' 3" should read --3x3--;  
Line 39, "3' 3" should read --3x3--;  
Line 49, "3' 3" should read --3x3--; and  
Line 54, "3' 3" should read --3x3--.

COLUMN 6:

Line 41, "3' 3" should read --3x3--; and  
Line 46, "3' 3" should read --3x3--.

COLUMN 10:

Line 27, "if" should read --is--.

COLUMN 11:

Line 66, "reflected-by" should read --reflected by--; and  
Line 67, "an image" should be deleted.

UNITED STATES PATENT AND TRADEMARK OFFICE
CERTIFICATE OF CORRECTION

| | |
|---|---|
| PATENT NO. | : 7,103,221 B2 |
| APPLICATION NO. | : 10/291496 |
| DATED | : September 5, 2006 |
| INVENTOR(S) | : Ken-ichi Ohta et al. |

It is certified that error appears in the above-identified patent and that said Letters Patent is hereby corrected as shown below:

<u>COLUMN 12</u>:

Line 36, "advances" should read --advance--.

<u>COLUMN 18</u>:

Line 31, "arbitrary" should read --arbitrarily--;
    Line 37, "a" should be deleted; and
    Line 38, "a" should be deleted.

Signed and Sealed this

Twentieth Day of January, 2009

JON W. DUDAS
*Director of the United States Patent and Trademark Office*